US011941372B2

(12) United States Patent
Barik et al.

(10) Patent No.: US 11,941,372 B2
(45) Date of Patent: Mar. 26, 2024

(54) EDIT AUTOMATION USING AN ANCHOR TARGET LIST

(71) Applicant: Microsoft Technology Licensing, LLC, Redmond, WA (US)

(72) Inventors: Titus Barik, Issaquah, WA (US); Gustavo Araujo Soares, Seattle, WA (US); Piyush Arora, Seattle, WA (US); Peter Groenewegen, Sammamish, WA (US); Sumit Gulwani, Sammamish, WA (US); Ameya Sanjay Ketkar, Corvallis, OR (US); Vu Minh Le, Redmond, WA (US); Wode Ni, Pittsburg, PA (US); David Ellis Pugh, Bellevue, WA (US); Arjun Radhakrishna, Seattle, WA (US); Ivan Radicek, Zagreb (HR); Ashish Tiwari, Sammamish, WA (US); Mark Alistair Wilson-Thomas, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 166 days.

(21) Appl. No.: 17/220,131

(22) Filed: Apr. 1, 2021

(65) Prior Publication Data

US 2022/0317978 A1 Oct. 6, 2022

(51) Int. Cl.
*G06F 40/166* (2020.01)
*G06F 8/20* (2018.01)
(Continued)

(52) U.S. Cl.
CPC .................. *G06F 8/33* (2013.01); *G06F 8/34* (2013.01); *G06F 8/41* (2013.01)

(58) Field of Classification Search
CPC ...... G06F 8/33; G06F 8/34; G06F 8/41; G06F 40/166; G06F 8/20; G06F 8/456
See application file for complete search history.

(56) References Cited

U.S. PATENT DOCUMENTS 8,566,789 B2    10/2013   Siddaramappa et al.
9,304,660 B1 *   4/2016   Brown, Jr. ............ G06F 3/0484
(Continued)

OTHER PUBLICATIONS

NPL1 ("Improve your code with lint checks", Mar. 24, 2021) (Year: 2021).*

(Continued)

*Primary Examiner* — Hang Pan
*Assistant Examiner* — Noor Alkhateeb
(74) *Attorney, Agent, or Firm* — Ogilvie Law Firm

(57) ABSTRACT

Edit automation functionality generalizes edits performed by a user in a document, locates similar text, and recommends or applies transforms while staying within a current workflow. Source code edits such as refactoring are automated. The functionality uses or provides anchor target lists, temporal edit patterns, edit graphs, automatable edit sequence libraries, and other data structures and computational techniques for identifying locations appropriate for particular edits, for getting transforms, for selecting optimal transforms, for leveraging transforms in an editing session or later, and for displaying transform recommendations and results. The edit automation functionality enhances automation subtool generation, discoverability, and flexibility, for refactoring, snippet insertion, quick actions in an integrated development environment, and other automatable edit sequences.

20 Claims, 8 Drawing Sheets

(51) Int. Cl.
  *G06F 8/33* (2018.01)
  *G06F 8/34* (2018.01)
  *G06F 8/41* (2018.01)

(56) References Cited

U.S. PATENT DOCUMENTS

| | | | |
|---|---|---|---|
| 9,823,909 B1* | 11/2017 | Kuo | G06F 8/52 |
| 10,534,604 B1* | 1/2020 | Kimball | G06F 8/427 |
| 2005/0166193 A1 | 7/2005 | Smith et al. | |
| 2007/0299793 A1 | 12/2007 | Musuvathi et al. | |
| 2008/0172650 A1 | 7/2008 | Gulwani et al. | |
| 2008/0276025 A1 | 11/2008 | Cherem et al. | |
| 2008/0282108 A1 | 11/2008 | Jojic et al. | |
| 2008/0301655 A1 | 12/2008 | Gulwani et al. | |
| 2009/0276763 A1 | 11/2009 | Gulwani et al. | |
| 2009/0313597 A1 | 12/2009 | Rathbone et al. | |
| 2009/0326907 A1 | 12/2009 | Gulwani et al. | |
| 2009/0327997 A1 | 12/2009 | Gulwani et al. | |
| 2010/0088548 A1 | 4/2010 | Gulwani et al. | |
| 2010/0088684 A1 | 4/2010 | Gulwani et al. | |
| 2010/0318980 A1 | 12/2010 | Gulwani et al. | |
| 2011/0078665 A1 | 3/2011 | Gulwani et al. | |
| 2011/0225572 A1 | 9/2011 | Stoicescu et al. | |
| 2011/0302553 A1 | 12/2011 | Gulwani et al. | |
| 2011/0314446 A1 | 12/2011 | Esbensen et al. | |
| 2012/0011084 A1 | 1/2012 | Gulwani et al. | |
| 2012/0011152 A1 | 1/2012 | Gulwani et al. | |
| 2012/0192051 A1 | 7/2012 | Rothschiller et al. | |
| 2012/0197829 A1 | 8/2012 | Nori et al. | |
| 2012/0198322 A1 | 8/2012 | Gulwani et al. | |
| 2013/0144902 A1 | 6/2013 | Gulwani et al. | |
| 2013/0188877 A1 | 7/2013 | Gulwani et al. | |
| 2013/0275847 A1 | 10/2013 | Gulwani et al. | |
| 2013/0326475 A1 | 12/2013 | Gulwani et al. | |
| 2013/0346982 A1 | 12/2013 | Kalai et al. | |
| 2014/0013299 A1 | 1/2014 | Bordeaux et al. | |
| 2014/0059078 A1 | 2/2014 | Gulwani et al. | |
| 2014/0108305 A1 | 4/2014 | Gulwani et al. | |
| 2014/0214399 A1 | 7/2014 | Gulwani et al. | |
| 2014/0236991 A1 | 8/2014 | Gulwani et al. | |
| 2014/0282375 A1 | 9/2014 | Gulwani et al. | |
| 2014/0282387 A1 | 9/2014 | Hammontree et al. | |
| 2015/0019216 A1 | 1/2015 | Singh et al. | |
| 2015/0082276 A1 | 3/2015 | Balachandran | |
| 2015/0089297 A1 | 3/2015 | Johnson et al. | |
| 2015/0095312 A1 | 4/2015 | Gulwani et al. | |
| 2015/0254211 A1 | 9/2015 | Gulwani et al. | |
| 2015/0254353 A1 | 9/2015 | Gulwani et al. | |
| 2015/0254530 A1 | 9/2015 | Gulwani et al. | |
| 2015/0331416 A1 | 11/2015 | Feniello et al. | |
| 2016/0103662 A1 | 4/2016 | Di Balsamo et al. | |
| 2016/0188301 A1 | 6/2016 | Zang et al. | |
| 2016/0299744 A1 | 10/2016 | Kalai et al. | |
| 2016/0299831 A1 | 10/2016 | Cimadamore et al. | |
| 2016/0314408 A1 | 10/2016 | Gulwani et al. | |
| 2016/0350276 A1 | 12/2016 | Gulwani et al. | |
| 2017/0075661 A1 | 3/2017 | Gulwani et al. | |
| 2017/0091589 A1 | 3/2017 | Gulwani et al. | |
| 2017/0161177 A1 | 6/2017 | Bird et al. | |
| 2017/0212829 A1* | 7/2017 | Bales | G06F 11/3604 |
| 2017/0220673 A1 | 8/2017 | Gulwani et al. | |
| 2018/0039693 A1 | 2/2018 | Singh et al. | |
| 2018/0113848 A1 | 4/2018 | Gulwani et al. | |
| 2018/0113873 A1 | 4/2018 | Gulwani et al. | |
| 2018/0113887 A1 | 4/2018 | Le et al. | |
| 2018/0113890 A1 | 4/2018 | Raza et al. | |
| 2018/0113894 A1 | 4/2018 | Raza et al. | |
| 2018/0113906 A1 | 4/2018 | Gulwani et al. | |
| 2018/0113907 A1 | 4/2018 | Gulwani et al. | |
| 2018/0113922 A1 | 4/2018 | Gulwani et al. | |
| 2018/0121525 A1 | 5/2018 | Simmons et al. | |
| 2018/0150500 A1 | 5/2018 | Le et al. | |
| 2018/0150554 A1 | 5/2018 | Le et al. | |
| 2018/0188897 A1 | 7/2018 | Gulwani et al. | |
| 2018/0246915 A1 | 8/2018 | Singh et al. | |
| 2019/0034437 A1 | 1/2019 | Gulwani et al. | |
| 2019/0171422 A1 | 6/2019 | Udupa et al. | |
| 2019/0212989 A1 | 7/2019 | Polozov et al. | |
| 2019/0235842 A1 | 8/2019 | Raza et al. | |
| 2019/0311004 A1 | 10/2019 | Gulwani et al. | |
| 2019/0311022 A1 | 10/2019 | Fan et al. | |
| 2019/0324730 A1 | 10/2019 | Gulwani et al. | |
| 2019/0332704 A1 | 10/2019 | Gulwani et al. | |
| 2019/0347267 A1 | 11/2019 | Le et al. | |
| 2019/0384763 A1 | 12/2019 | Malak et al. | |
| 2019/0384851 A1 | 12/2019 | Le et al. | |
| 2020/0097261 A1* | 3/2020 | Smith | G06N 3/084 |
| 2020/0356365 A1* | 11/2020 | Pezaris | G06F 8/30 |
| 2021/0026605 A1 | 1/2021 | Evangelopoulos et al. | |
| 2021/0357599 A1* | 11/2021 | Gupta | G06F 40/211 |
| 2021/0373942 A1* | 12/2021 | Lv | G06F 3/04847 |
| 2022/0188081 A1* | 6/2022 | Ni | G06N 3/0454 |
| 2022/0261231 A1* | 8/2022 | Lewis | G06N 3/04 |
| 2022/0317979 A1 | 10/2022 | Araujo Soares et al. | |

OTHER PUBLICATIONS

NPL1 "Refactoring made easy with IntelliCode!", Mark Wilson-Thomas, Sep. 5, 2019 (Year: 2019).*
Nguyen NPL titled "Graph-Based Pattern-Oriented, Context-Sensitive Source Code Completion" (Year: 2012).*
"Unicode", retrieved from <<https://en.wikipedia.org/wiki/Unicode>>, Mar. 23, 2021, 31 pages.
"Source-code editor", retrieved from <<https://en.wikipedia.org/wiki/Source-code_editor>>, Mar. 7, 2021, 2 pages.
Peter Groenewegen, "Frictionless repeated edits: IntelliCode suggestions in completion list", retrieved from <<https://devblogs.microsoft.com/visualstudio/repeated-edits-intellicode-suggestions-completion-list/>>, Mar. 3, 2021, 5 pages.
"Software Research Seminar (SSSG)", retrieved from <<https://www.isri.cmu.edu/events/sssg.html>>, retrieved Mar. 6, 2021, 16 pages.
"Human-centered computing", retrieved from <<https://en.wikipedia.org/wiki/Human-centered_computing>>, Dec. 9, 2020, 8 pages.
"Structural search and replace examples", retrieved from <<https://www.jetbrains.com/help/phpstorm/structural-search-and-replace-examples.html>>, Mar. 8, 2021, 5 pages.
"Add intellicode API for generating code action edits from intents and #51911", retrieved from <<https://github.com/dotnet/roslyn/pull/51911/files>>, retrieved Mar. 31, 2021, 24 pages.
"Find references in your code", retrieved from <<https://docs.microsoft.com/en-us/visualstudio/ide/finding-references?view=vs-2019>>, Sep. 26, 2017, 3 pages.
Emerson Murphy-Hill and Andrew P. Black, "Breaking the Barriers to Successful Refactoring: Observations and Tools for Extract Method", retrieved from <<http://doi.acm.org/10.1145/1368088.1368146>>, 2008, 10 pages.
"Common Quick Actions", retrieved from <<https://docs.microsoft.com/en-us/visualstudio/ide/common-quick-actions?view=vs-2019>>, Mar. 28, 2018, 19 pages.
"Intention actions", retrieved from <<https://www.jetbrains.com/help/idea/intention-actions.html>>, Mar. 9, 2021, 2 pages.
"Code refactoring", retrieved from <<https://www.jetbrains.com/help/idea/refactoring-source-code.html>>, Mar. 8, 2021, 4 pages.
"Heapcon 2019 | Automated Program Generation from InputOutput Examples", Retrieved From: https://www.youtube.com/watch?v=X1YXge3C8RI&t=1s, Oct. 18, 2019, 2 Pages.
"IntelliJ IDEA. Everyday Refactorings", Retrieved From: https://www.youtube.com/watch?v=rPq7fBo5JVs, Jul. 1, 2020, 2 Pages.
Kim, et al., "Recommending Program Transformations to Automate Repetitive Software Changes", In Proceedings of the Recommendaction Systems in Software Engineering, Jan. 1, 2014, 31 Pages.
"Visual Studio IntelliCode", Retrieved From: https://www.youtube.com/watch?v=aEsrpLa_OMs, Aug. 11, 2019, 2 Pages.
"Non Final Office Action Issued in U.S. Appl. No. 17/220,156", dated May 13, 2022, 31 Pages.
Bruch, et al., "Learning from Examples to Improve Code Completion Systems", In Proceedings of the 7th Joint Meeting of the

(56) References Cited

OTHER PUBLICATIONS

European Software Engineering Conference and the ACM SIGSOFT Symposium on the Foundations of Software Engineering, Aug. 23, 2009, pp. 213-222.
Svyatkovskiy, et al., "IntelliCode Compose: Code Generation using Transformer", In Proceedings of the 28th ACM Joint Meeting on European Software Engineering Conference and Symposium on the Foundations of Software Engineering, Nov. 8, 2020, pp. 1433-1443.
Meng, et al., "Automating Program Transformations based on Examples of Systematic Edits", Retrieved From: https://repositories.lib.utexas.edu/bitstream/handle/2152/28059/MENG-DISSERTATION-2014.pdf?sequence=1, Jan. 1, 2014, 160 Pages.
"Final Office Action Issued in U.S. Appl. No. 17/220,156", dated Nov. 14, 2022, 31 Pages.
Nguyen, "Graph-based Mining of Multiple Object usage Patterns", In Proceedings of 7th Joint Meeting of the European Software Engineering Conference and the ACM SIGSOFT Symposium on the Foundations of Software Engineering, Aug. 24, 2009, pp. 383-392.
Nguyen, et al., "Graph-based Pattern-oriented, Context-sensitive Source Code Completion", In Proceedings of the 34th International Conference on Software Engineering, Jun. 2, 2012, pp. 69-79.
Nguyen, et al., "Graph-based Statistical Language Model for Code", In Proceedings of the 37th International Conference on Software Engineering, vol. 1, May 16, 2015, pp. 858-868.
"International Search Report and Written Opinion Issued in PCT Application No. PCT/US22/020467", dated Jun. 30, 2022, 14 Pages.
"International Search Report and Written Opinion Issued in PCT Application No. PCT/US22/020471", dated Jun. 24, 2022, 12 Pages.
Smacchia, Patrick, "Visual Studio IntelliCode : AI Assisted Coding", Retrieved From: https://web.archive.org/web/20210302112159/https://blog.ndepend.com/visual-studio-intellicode-ai-assisted-coding/, Mar. 2, 2021, 10 Pages.
"Language Workbenches: The Killer-App for Domain Specific Languages", Retrieved from: https://martinfowler.com/articles/languageWorkbench.html, Jun. 12, 2005, 40 Pages.
Chasins et al., "Rousillon: Scraping Distributed Hierarchical Web Data", In Proceedings of the 31st Annual ACM Symposium on User Interface Software and Technology, Oct. 14, 2018, pp. 963-975.
Cypher, Allen, "Watch what I Do: Programming by Demonstration", In Publication of MIT Press, Aug. 1993, 2 Pages.
Drosos et al., "Wrex: A Unified Programming-by-Example Interaction for Synthesizing Readable Code for Data Scientists", In Proceedings of the CHI Conference on Human Factors in Computing Systems, Apr. 25, 2020, pp. 1-12.
Fujishima, "Demonstrational Automation of Text Editing Tasks Involving Multiple Focus Points and Conversions", In Proceedings of the 3rd international conference on Intelligent user interfaces, Association for Computing Machinery, Jan. 1, 1998, pp. 101-108.
Gu et al., "Deep Code Search", In Proceedings of the IEEE/ACM 40th International Conference on Software Engineering (ICSE), May 27, 2018, pp. 933-944.
Gulwani, Sumit, "Programming by Examples", In Dependable Software Systems Engineering, Apr. 19, 2016, 22 Pages.
Hempel et al., "Deuce: a Lightweight user Interface for Structured Editing", In Proceedings of the 40th International Conference on Software Engineering, May 2018, pp. 654-664.
Hempel, "Sketch-n-Sketch: Output-Directed Programming for SVG", In Proceedings of the 32nd Annual ACM Symposium on User Interface Software and Technology, Oct. 20, 2019, 14 Pages.
Hempel et al., "Tiny Structure Editors for Low, Low Prices! (Generating GUIs from toString Functions)", In Proceedings of IEEE Symposium on Visual Languages and Human-Centric Computing (VL/HCC), Aug. 10, 2020, 5 Pages.
Kim et al., "An Empirical Study of Code Clone Genealogies", In Proceedings of the 10th European software engineering conference held jointly with 13th ACM SIGSOFT international symposium on Foundations of software engineering, Sep. 5, 2005, pp. 187-196.
Ko et al., "An Exploratory Study of How Developers Seek, Relate, and Collect Relevant Information during Software Maintenance Tasks", In Proceedings of IEEE Transactions on Software Engineering, vol. 32, No. 12, Dec. 1, 2006, pp. 971-987.
Ko et al., "Design Requirements for more Flexible Structured Editors from a Study of Programmers' text editing", In Extended Abstracts on Human Factors in Computing Systems, Apr. 2, 2005, pp. 1557-1560.
Latoza et al., "Maintaining Mental Models: A study of Developer Work Habits", In Proceedings of the 28th International Conference on Software Engineering, May 20, 2006, pp. 492-501.
Mayer et al., "Bidirectional Evaluation with Direct Manipulation", In Proceedings of the ACM on Programming Languages, vol. 2, Article 127, Nov. 2018, 28 Pages.
Miller et al., "Interactive Simultaneous Editing of Multiple Text Regions", In Proceedings of USENIX Annual Technical Conference, Jun. 25, 2001, pp. 161-174.
Miltner et al., "On the Fly Synthesis of Edit Suggestions", In Proceedings of the ACM on Programming Languages, Article 143, Oct. 10, 2019, 29 Pages.
Mossienko, Maxim, "Structural Search and Replace: What, why, and how-to", Retrieved from: https://web.archive.org/web/20060514004958/https://www.jetbrains.com/idea/docs/ssr.pdf, Retrieved Date: May 14, 2006, pp. 1-5.
Murphy et al., "How Are Java Software Developers Using the Eclipse IDE?", In Journal of IEEE Computer Society, vol. 23, Issue 4, Jul. 17, 2006, pp. 76-83.
Myers, Brad A. , "Taxonomies of Visual Programming and Program Visualization", In Journal of Visual Languages & Computing, Sep. 20, 1989, 33 Pages.
Nguyen et al., "A study of Repetitiveness of Code Changes in Software Evolution", In Proceedings of the 28th IEEE/ACM International Conference on Automated Software Engineering, Nov. 11, 2013, pp. 180-190.
Omar et al., "Active Code Completion", In Proceedings of the 34th International Conference on Software Engineering, Jun. 2012, pp. 859-869.
Pech et al., "JetBrains MPS as a tool for Extending Java", In Proceedings of the International Conference on Principles and Practices of Programming on the Java Platform: Virtual Machines, Languages, and Tools, Sep. 11, 2013, pp. 165-168.
Raychev et al., "Refactoring with Synthesis", In Proceedings of ACM SIGPLAN InternationalConference on Object Oriented Programming Systems Languages & Applications, Oct. 29, 2013, pp. 339-354.
Resnick et al., "Scratch: Programming for All", In Journal of Communications of the ACM, vol. 52, No. 11, Nov. 1, 2009, pp. 60-67.
Rolim et al., "Learning Syntactic Program Transformations from Examples", In Proceedings of the 39th International Conference on Software Engineering, May 20, 2017, pp. 404-415.
Sadowski et al., "How Developers Search for Code: a Case Study", In Proceedings of the 10th Joint Meeting on Foundations of Software Engineering, Aug. 30, 2015, pp. 191-201.
Santolucito et al., "Live Programming By Example", In Extended Abstracts of the Conference on Human Factors in Computing Systems, May 4, 2019, 4 Pages.
Schuster et al., "Live Programming by Example: Using Direct Manipulation for Live Program Synthesis", https://chris-schuster.net/live16/html/, Jul. 17, 2016, 19 Pages.
Teitelbaum et al., "The Cornell Program Synthesizer: a Syntax-Directed Programming Environment", In Communications of the ACM, vol. 24, No. 9, Sep. 1981, pp. 563-573.
Toomim et al., "Managing Duplicated Code with Linked Editing", In IEEE Symposium on Visual Languages—Human Centric Computing, Sep. 26, 2004, 9 Pages.
ReSharper, Retrieved from: https://web.archive.org/web/20210308052305/https://www.jetbrains.com/resharper/, Mar. 8, 2001, 12 Pages.
Visual Studio, Retrieved from: https://web.archive.org/web/20210313183855/https://visualstudio.microsoft.com/, Mar. 13, 2021, 8 Pages.

(56) References Cited

OTHER PUBLICATIONS

Brito, et al., "Refactoring Graphs: Assessing Refactoring over Time", In Proceedings of IEEE 27th International Conference on Software Analysis, Evolution and Reengineering, Feb. 18, 2020, 11 Pages.

Campbell, et al., "Coding In-depth Semistructured Interviews: Problems of Unitization and Intercoder Reliability and Agreement", In Journal of Sociological Methods & Research, Aug. 21, 2013, pp. 294-320.

Eppstein, David, "Parallel recognition of series-parallel graphs", In Journal of Information and Computation, vol. May 1992, pp. 41-55.

Foster, et al., "Witchdoctor: IDE Support for Real-Time Auto-Completion of Refactorings", In Proceedings of the 34th International Conference on Software Engineering, Jun. 2, 2012, pp. 222-232.

Ge, et al., "Reconciling Manual and Automatic Refactoring", In Proceedings of the 34th International Conference on Software Engineering, Jun. 2, 2012, pp. 211-221.

Gross, et al., "Graph Theory and Its Application", In The Mathematical Gazette, vol. 84, No. 499, Mar. 2000, pp. 182-183.

Hill, et al., "How We Refactor, and How We Know It", In IEEE Transactions on Software Engineering, vol. 38, Issue 1, Jan. 2012, pp. 5-18.

Huan, et al., "Efficient mining of frequent subgraphs in the presence of isomorphism", In Third IEEE international conference on data mining, Nov. 22, 2003, 12 Pages.

Miltner, et al., "On the fly synthesis of edit suggestions", In Proceedings of the ACM on Programming Languages, Oct. 10, 2019, 29 Pages.

Negara, et al., "Mining Fine-Grained Code Changes to Detect Unknown Change Patterns", In Proceedings of the 36th International Conference on Software Engineering, May 2014, pp. 803-814.

Nguyen, et al., "Graph-Based Mining of In-the-Wild, Fine-Grained, Semantic Code Change Patterns", In Proceedings of IEEE/ACM 41st International Conference on Software Engineering, May 25, 2019, pp. 819-830.

Nijssen, et al., "The Gaston Tool for Frequent Subgraph Mining", In Journal of Electronic Notes in Theoretical Computer Science, vol. 127, Issue 1, Mar. 30, 2005, pp. 77-87.

Proksch, et al., "Enriching in-IDE process information with fine-grained source code history", In Proceedings of IEEE 24th International Conference on Software Analysis, Evolution and Reengineering, Feb. 20, 2017, pp. 250-260.

Rolim, et al., "Learning quick fixes from code repositories", In Journal of Computing Research Repository, Mar. 2018, pp. 1-12.

J. Andersen and J. L. Lawall. 2008. Generic Patch Inference. In Proceedings of the 2008 23rd IEEE/ACM International Conference on Automated Software Engineering (ASE '08). IEEE Computer Society, USA, 337-346. https://doi.org/10.1109/ASE.2008.44.

Scott, et al., "Getafix: Learning to Fix Bugs Automatically", In Proceedings of the ACM on Programming Languages, Oct. 2019, 27 Pages.

Yan, et al., "gSpan: graph-based substructure pattern mining", In Proceedings of IEEE International Conference on Data Mining, Dec. 9, 2002, pp. 721-724.

Saldaña, Johnny, The Coding Manual for Qualitative Researchers, In SAGE Publications, Jan. 2009, 118 Pages.

Deeksha Arya, Wenting Wang, Jin L. C. Guo, and Jinghui Cheng. 2019. Analysis and Detection of Information Types of Open Source Software Issue Discussions. In Proceedings of the 41st International Conference on Software Engineering (ICSE '19). IEEE Press, 454-464. https://doi.org/10.1109/ICSE.2019.00058.

T. Barik, Y. Song, B. Johnson, and E. Murphy-Hill. 2016. From Quick Fixes to Slow Fixes: Reimagining Static Analysis Resolutions to Enable Design Space Exploration. In 2016 IEEE International Conference on Software Maintenance and Evolution (ICSME). 211-221. https://doi.org/10.1109/ICSME.2016.63.

William S. Evans, Christopher W. Fraser, and Fei Ma. 2009. Clone Detection via Structural Abstraction. Software Quality Journal 17, 4 (Dec. 2009), 309-330. https://doi.org/10.1007/s11219-009-9074-y.

V. J. Hellendoorn, S. Proksch, H. C. Gall, and A. Bacchelli. 2019. When Code Completion Fails: A Case Study on Real-World Completions. In 2019 IEEE/ACM 41st International Conference on Software Engineering (ICSE). 960-970. https://doi.org/10.1109/ICSE.2019.00101.

L. Jiang, G. Misherghi, Z. Su, and S. Glondu. 2007. DECKARD: Scalable and Accurate Tree-Based Detection of Code Clones. In 29th International Conference on Software Engineering (ICSE'07). 96-105. https://doi.org/10.1109/ICSE.2007.30.

Ameya Ketkar, Nikolaos Tsantalis, and Danny Dig. 2020. Understanding Type Changes in Java. Association for Computing Machinery, New York, NY, USA, 629-641. https://doi.org/10.1145/3368089.3409725.

M. Kim, D. Notkin, D. Grossman, and G. Wilson. 2013. Identifying and Summarizing Systematic Code Changes via Rule Inference. IEEE Transactions on Software Engineering 39, 1 (2013), 45-62. https://doi.org/10.1109/TSE.2012.16.

Na Meng, Miryung Kim, and Kathryn S. Mckinley. [n. d.]. Sydit: Creating and applying a program transformation from an example. In in ESEC/FSE'11, 2011. 440-443.

Na Meng, Miryung Kim, and Kathryn S. Mckinley. 2013. LASE: Locating and Applying Systematic Edits by Learning from Examples. In Proceedings of the 2013 International Conference on Software Engineering (ICSE '13). IEEE Press, 502-511.

Emerson Murphy-Hill, Chris Parnin, and Andrew P. Black. 2009. How We Refactor, and HowWe Know It. In Proceedings of the 31st International Conference on Software Engineering (ICSE '09). IEEE Computer Society, USA, 287-297. https://doi.org/10.1109/ICSE.2009.5070529.

Stas Negara, Mohsen Vakilian, Nicholas Chen, Ralph E. Johnson, and Danny Dig. 2012. Is It Dangerous to Use Version Control Histories to Study Source Code Evolution?. In Proceedings of the 26th European Conference on Object-Oriented Programming (ECOOP'12). Springer-Verlag, Berlin, Heidelberg, 79-103. https://doi.org/10.1007/978-3-642-31057-7_5.

H. A. Nguyen, A. T. Nguyen, T. T. Nguyen, T. N. Nguyen, and H. Rajan. 2013. A study of repetitiveness of code changes in software evolution. In 2013 28th IEEE/ACM International Conference on Automated Software Engineering (ASE). 180-190. https://doi.org/10.1109/ASE.2013.6693078.

Nikolaos Tsantalis, Ameya Ketkar, and Danny Dig. 2020. RefactoringMiner 2.0. IEEE Transactions on Software Engineering (2020), 21. https://doi.org/10.1109/TSE.2020.3007722.

Mohsen Vakilian, Nicholas Chen, Roshanak Zilouchian Moghaddam, Stas Negara, and Ralph E. Johnson. 2013. A Compositional Paradigm of Automating Refactorings. In ECOOP 2013—Object-Oriented Programming, Giuseppe Castagna (Ed.). Springer Berlin Heidelberg, Berlin, Heidelberg, 527-551.

Z. Yu, C. Bai, L. Seinturier, and M. Monperrus. 2019. Characterizing the Usage, Evolution and Impact of Java Annotations in Practice. IEEE Transactions on Software Engineering (2019), 1-1. https://doi.org/10.1109/TSE.2019.2910516.

Xiang Gao, Shraddha Barke, Arjun Radhakrishna, Gustavo Soares, Sumit Gulwani, Alan Leung, Nachiappan Nagappan, and Ashish Tiwari. 2020. Feedback-Driven Semi-Supervised Synthesis of Program Transformations. 4, OOPSLA, Article 219 (Nov. 2020), 30 pages. https://doi.org/10.1145/3428287.

Davood Mazinanian, Ameya Ketkar, Nikolaos Tsantalis, and Danny Dig. 2017. Understanding the Use of Lambda Expressions in Java. Proc. ACM Program. Lang. 1, OOPSLA, Article 85 (Oct. 2017), 31 pages. https://doi.org/10.1145/3133909.

Ali Mesbah, Andrew Rice, Emily Johnston, Nick Glorioso, and Edward Aftandilian. 2019. DeepDelta: Learning to Repair Compilation Errors. In Proceedings of the 2019 27th ACM Joint Meeting on European Software Engineering Conference and Symposium on the Foundations of Software Engineering (ESEC/FSE 2019). Association for Computing Machinery, New York, NY, USA, 925-936. https://doi.org/10.1145/3338906.3340455.

(56) References Cited

OTHER PUBLICATIONS

Peter Groenewegen, "Make your repeated edits faster and more accurate with IntelliCode suggestions", retrieved from <<https://devblogs.microsoft.com/visualstudio/intellicode-suggestion-apply-all/>>, Nov. 11, 2020.

Hoan Anh Nguyen, Tung Thanh Nguyen, Gary Wilson, Anh Tuan Nguyen, Miryung Kim, and Tien N. Nguyen. 2010. A Graph-Based Approach to API Usage Adaptation. In Proceedings of the ACM International Conference on Object Oriented Programming Systems Languages and Applications (OOPSLA '10). Association for Computing Machinery, New York, NY, USA, 302-321. https://doi.org/10.1145/1869459.1869486.

Rumen Paletov, Petar Tsankov, Veselin Raychev, and Martin Vechev. 2018. Inferring Crypto API Rules from Code Changes. SIGPLAN Not. 53, 4 (Jun. 2018), 450-464. https://doi.org/10.1145/3296979.3192403.

Sebastian Proksch, Sven Amann, and Sarah Nadi. 2018. Enriched Event Streams: A General Dataset for Empirical Studies on in-IDE Activities of Software Developers. In Proceedings of the 15th International Conference on Mining Software Repositories (MSR '18). Association for Computing Machinery, New York, NY, USA, 62-65. https://doi.org/10.1145/3196398.3196400.

Baishakhi Ray, Christopher Wiley, and Miryung Kim. 2012. Repertoire: A Cross-System Porting Analysis Tool for Forked Software Projects. In Proceedings of the ACM SIGSOFT 20th International Symposium on the Foundations of Software Engineering (FSE '12). Association for ComputingMachinery, New York, NY, USA, Article 8, 4 pages. https://doi.org/10.1145/2393596.2393603.

D. A. Wheeler. [n. d.]. SLOCCount. https://dwheeler.com/sloccount/. retrieved Mar. 31, 2021.

R. Bloem, H. N. Gabow, and F. Somenzi. 2006. An algorithm for strongly connected component analysis in n log n symbolic steps. Formal Methods in System Design 28, 1 (2006), 37-56.

Pengcheng Yin, Graham Neubig, Miltiadis Allamanis, Marc Brockschmidt, and Alexander Gaunt. 2019. Learning to Represent Edits. In ICLR 2019. https://www.microsoft.com/en-us/research/publication/learning-torepresent-edits/ arXiv:1810.13337 [cs.LG].

David Ramel, "Microsoft Boosts AI-Assisted Developer Productivity", retrieved from <<https://visualstudiomagazine.com/articles/2019/11/05/ai-tooling.aspx>>, Nov. 5, 2019, 7 pages.

Risabh Sing, et al., "Transformin g Spreadsheet Data Types Using Examples", retrieved from <<http://people.csail.mit.edu/rishabh/papers/popl16-semantic.pdf>>, 2016, 14 pages.

Risabh Sing, et al., "Synthesizing Number Transformations from Input-Output Examples", retrieved from <<https://www.microsoft.com/en-us/research/wp-content/uploads/2016/06/cav12-1-1.pdf>>, 2016, 18 pages.

Risabh Sing, et al., "Learning Semantic String Transformations from Examples", retrieved from <<http://vldb.org/pvldb/vol5/p740_rishabhsingh_vldb2012.pdf>>, 2012, 12 pages.

Lars Vogel, "Regular expressions in Java—Tutorial", retrieved from <<https://www.vogella.com/tutorials/JavaRegularExpressions/article.html>>, 2019, 15 pages.

"Overview of source code analyzers", retrieved from <<https://docs.microsoft.com/en-us/visualstudio/code-quality/roslyn-analyzers-overview?view=vs-2019>>, Oct. 3, 2019, 5 pages.

"Microsoft Program Synthesis using Examples SDK", retrieved from <<https://microsoft.github.io/prose/>>, no later than Apr. 1, 2020, 2 pages.

"Tutorial", retrieved from <<https://microsoft.github.io/prose/documentation/prose/tutorial/>>, no later than Apr. 1, 2020, 13 pages.

"Intelligent code completion", retrieved from <<https://en.wikipedia.org/wiki/Intelligent_code_completion>>, Jan. 24, 2020, 5 pages.

"Autocomplete", retrieved from <<https://en.wikipedia.org/wiki/Autocomplete>>, Mar. 12, 2020, 8 pages.

"Integrated development environment", retrieved from <<https://en.wikipedia.org/wiki/Integrated_development_environment>>, Feb. 11, 2020, 4 pages.

Amanda Silver, "Introducing Visual Studio IntelliCode", retrieved from <<https://devblogs.microsoft.com/visualstudio/introducing-visual-studio-intellicode/>>, May 7, 2018, 5 pages.

Anders Miltner, et al., "On the Fly Synthesis of Edit Suggestions", retrieved from <<https://www.microsoft.com/en-us/research/uploads/prod/2019/08/PBE-OOPSLA-2019.pdf>>, 2019, 29 pages.

Gabriele Tomassetti, "A Guide to Code Generation", retrieved from <<https://tomassetti.me/code-generation/>>, May 9, 2018, 33 pages.

"Pick the right tools for .NET development", retrieved from <<https://www.jetbrains.com/dotnet/promo/tools/>> no later than Apr. 2, 2020, 5 pages.

"PyCharm", retrieved from <<https://en.wikipedia.org/wiki/PyCharm>>, Feb. 29, 2020, 3 pages.

"Eclipse (software)", retrieved from <<https://en.wikipedia.org/wiki/Eclipse_(software)>>, Mar. 31, 2020, 12 pages.

Ian Drosos, et al., "Wrex: A Unifed Programming-by-Example Interaction for Synthesizing Readable Code for Data Scientists", retrieved from <<https://www.microsoft.com/en-us/research/uploads/prod/2020/03/chi20c-sub4932-cam-16.pdf>>, no later than Apr. 2, 2020, 12 pages.

"Find patterns in strings with the Microsoft PROSE Code Accelerator SDK", retrieved from <<https://docs.microsoft.com/en-us/python/api/overview/azure/prose/findpatterns?view=prose-py-latest>>, Sep. 24, 2018, 7 pages.

"Programming language", retrieved from <<https://en.wikipedia.org/wiki/Programming_language>>, Apr. 14, 2020, 22 pages.

"Quick Actions", retrieved from <<https://docs.microsoft.com/en-us/visualstudio/ide/quick-actions?view=vs-2019>>, Mar. 28, 2018, 3 pages.

"IntelliCode suggestions", retrieved from <<https://docs.microsoft.com/en-us/visualstudio/intellicode/intellicode-suggestions>>, Apr. 8, 2019, 3 pages.

"What is $1 and $2 in Regular Expressions?", retrieved from <<https://stackoverflow.com/questions/19141069/what-is-1-and-2-in-regular-expressions/19141152#19141152>>, Oct. 2, 2013, 3 pages.

"EditPad Lite: Basic Text Editor with Full Regular Expression Support", retrieved from <<https://www.regular-expressions.info/editpadlite.html>>, Mar. 20, 2020, 2 pages.

"Structural search and replace", retrieved from <<https://web.archive.org/web/20191209221136/https:/www.jetbrains.com/help/idea/structural-search-and-replace.html>>, Dec. 9, 2019, 9 pages.

Zhengong Cai, et al., "A Pattern-Based Code Transformation Approach for Cloud Application Migration", retrieved from <<https://docplayer.net/18105214-A-pattern-based-code-transformation-approach-for-cloud-application-migration.html>>, no later than Apr. 14, 2020, 8 pages.

Alberto Bartoli, et al., "Automatic Synthesis of Regular Expressions from Examples", retrieved from <<https://arts.units.it/retrieve/handle/11368/2758954/57751/2014-Computer-AutomaticSynthesisRegexExamples%20(2).pdf>>, Jul. 5, 2013, 16 pages.

Alberto Bartoli, et al., "Inference of Regular Expressions for Text Extraction from Examples", retrieved from <<https://www.human-competitive.org/sites/default/files/bartoli-delorenzo-medvet-tarlao-tkde-paper.pdf>>, May 2016, 14 pages.

Alvis Brazma, "Efficient Identification of Regular Expressions from Representative Examples", retrieved from <<https://dl.acm.org/doi/pdf/10.1145/168304.168340?download=true>>, 1993, 7 pages.

Xinyu Wang, et al., "FIDEX: Filtering Spreadsheet Data using Examples", retrieved from <<https://www.microsoft.com/en-us/research/wp-content/uploads/2016/12/oopsla16-spreadsheet.pdf>>, 2016, 20 pages.

Saswat Padhi, et al., "FlashProfile: A Framework for Synthesizing Data Profiles", retrieved from <<https://www.microsoft.com/en-us/research/publication/flashprofile-a-framework-for-synthesizing-data-profiles/>>, 2018, 2 pages.

Saswat Padhi, et al., "FlashProfile: A Framework for Synthesizing Data Profiles", retrieved from <<https://alexpolozov.com/papers/oopsla2018-flashprofile.pdf>>, 2018, 28 pages.

"FIDEX: Filtering Spreadsheet Data using Examples", retrieved from <<https://www.youtube.com/watch?v=4-AjWKRGHC4>>, 2016, 1 page.

(56) References Cited

OTHER PUBLICATIONS

"Notice of Allowance Issued in U.S. Appl. No. 17/220,156", dated Jun. 5, 2023, 16 Pages.
"Notice of Allowance Issued in U.S. Appl. No. 17/220,156", dated Sep. 19, 2023, 10 Pages.

* cited by examiner

| SOME ASPECTS OF SOME ANCHOR TARGET LISTS (ATLS) 316 ||
|---|---|
| CLUSTERED 428 USER-EDITABLE 426 SOURCE CODE 430 ||
| LENGTH 432 (LOCATIONS COUNT) | DESIGNATED 410 LOCATION 412, 414 |
| COMPILATION 416: ERROR 418, WARNING 420 | SOFTWARE DEVELOPMENT 422: TOOL 424, ERROR 418, WARNING 420 |
| STRING SEARCH 402 RESULT 404 | STRUCTURAL SEARCH 406 RESULT 408 |

Fig. 4

| SOME ASPECTS OF SOME TRANSFORM PROVIDERS 216 OR TRANSFORMS 218 |||
|---|---|---|
| TRANSFORM SYNTHESIZER 502 | AUTOMATABLE SEQUENCES LIBRARY 220 INTERFACE 514 | USER FEEDBACK 512 |
| CONFIDENCE SCORE 504 |||
| TEXT-TO-FIND EXAMPLE 510 | PATTERN MATCH CODE 506, INSTANCE 508 ||

Fig. 5

| SOME ASPECTS OF SOME USER INTERFACES 208 |||
|---|---|---|
| EDITING WORKFLOW 606 | ACTION 618 BUTTON 616 | COMMAND 624 |
| INPUT DEVICE 620 | AMBIENT VISUALIZATION SCREEN REGION 622 ||
| RECOMMENDATION 610 PRESENTATION 612 MECHANISM 602 INTRUSIVENESS 604 RANK 608 || LINE 626 |
| DIFF VIEW 614 | EDITING INITIATIVE 628 | UNDO REQUEST 630 |

Fig. 6

1: function HIERARCHICALCLUSTER(edits)
2:     $Clusters_0 \leftarrow \{Inserts(edits), Deletes(edits), Updates(edits)\}$
3:     $d \leftarrow 0$
4:     while $C_d \neq \emptyset$ do
5:         $d \leftarrow d + 1$
6:         $Clusters_d \leftarrow \bigcup \{Clustering(C, embed_d) \mid C \in C_d \land |C| > 1\}$
7:     return $\bigcup_d Clusters_d$ 8: function BUILDEDITGRAPH(edits)
9:     $edits \leftarrow $ PRUNE(edits)
10:    $E_{sub} \leftarrow \{ ed \rightarrow ed' \mid \exists ed, ed' \in edits.\ SameSession(ed, ed') \land$
                           $ed \rightarrow_{sub} ed' \}$
11:    $E_{seq} \leftarrow \{ ed \rightarrow ed' \mid \exists ed, ed' \in edits.\ SameSession(ed, ed') \land$
                           $ed \rightarrow_{seq} ed' \}$
12:    $EditGraph \leftarrow (V = edits, E_{sub}, E_{seq})$ 13: function QUOTIENT($(V, E_{sub}, E_{seq}), CS, n$)
14:    $V^q \leftarrow CS$
15:                            ▷ Below, $\exists^n$ stands for there exist $n$ distinct
16:    $E^q_{sub} \leftarrow \{C \rightarrow C' \mid C, C' \in CS \land \exists^n ed \in C, ed' \in C'.\ ed \rightarrow ed' \in E_{sub}\}$
17:    $E^q_{seq} \leftarrow \{C \rightarrow C' \mid C, C' \in CS \land \exists^n ed \in C, ed' \in C'.\ ed \rightarrow ed' \in E_{seq}\}$
18:    return $(V^q, E^q_{sub}, E^q_{seq})$ 19: function MINETEMPORALEDITPATTERNS(Sessions, threshold)
20:    $edits \leftarrow \bigcup \{Edits(Session) \mid Session \in Sessions\}$
21:    $EditGraph \leftarrow $ BUILDEDITGRAPH(edits)
22:    $Clusters \leftarrow $ HIERARCHICALCLUSTER(edits, threshold)
23:    $TemporalSummary \leftarrow $ QUOTIENT(EditGraph, Clusters, $n$)
24:    $TemporalEditPatterns \leftarrow $ FREQUENTPATTERNS(TemporalSummary)
25:    return TemporalEditPatterns

Fig. 14

```
class Node {
    Node () {
    }
}
```
v0

```
  class Node {
-   public str Id {}
+   public str Id {get;}
    Node () {
    }
}
```
v2

```
    class Node {
      public str Id {get; set;}
      Node () {
      }
-
+   Node (str id) {
    }
```
v4

```
+   public str Id {}
    class Node {
      Node () {
      }
    }
```
v1

```
    class Node {
-     public str Id {get;}
+     public str Id {get; set;}
      Node () {
      }
    }
```
v3

```
    class Node {
      public str Id {get; set;}
      Node (str id) {
+       Id = id;
      }
    }
```
v5

Fig. 15

EDIT AUTOMATION USING AN ANCHOR TARGET LIST

BACKGROUND

Noon Programs for creating, modifying, or otherwise editing documents were among the first software tools created, and such editors have undergone many changes over time, including many improvements. Some editing tools accept input not only in the form of characters typed on a keyboard, but also in the form of data sent from a mouse, pen, touch pad, touch screen, microphone, or other device. Some permit a user to define a sequence of keys as a macro, allowing the user to easily repeat a command sequence. Many editors provide a WYSIWYG (what you see is what you get) user experience, so that an appearance of a document onscreen in the editor closely resembles a result of printing the document. Some editing tools support multiple windows, to assist a user who is contemporaneously editing multiple files or editing different parts of a given file, or both. Some editors support integration of graphic images into a document, or provide a user with access to graphics editing tools within a document editing session.

The range of "text" operated upon by an editor was originally limited mostly to alphabet letters, numbers, and punctuation. But over time, the text one can edit with a program has expanded to include at least mathematical symbols, geometric shapes, music and other notational systems, logographic and syllabic scripts, and many other written symbols. As of the present time, the Unicode® technology standard for encoding, representing, and handling text covers over 150 modern and historic scripts, including over 140,000 characters (mark of Unicode, Inc.).

Some editors are specialized for particular knowledge areas or fields of practice, such as video editing, sound editing, or software source code editing. In particular, some source code editors provide integrated functionality for syntax checking, autocompletion, indentation, brace matching, and easy access to a compiler, interpreter, or debugger.

Despite these advancements, improvements are still possible in the field of tools for editing source code or other documents that contain text.

SUMMARY

Some embodiments described herein automate editing. Edit automation may generalize one or more examples of edits performed by a user, and then locate text instances that do not necessarily match the exact string edited by the user but are similar enough for corresponding edits to be helpful. Edit automation may be designed to stay within a current workflow, so that desired changes to a document are made without diverting the user's thoughts from what those changes should be onto a separate track of how to make the changes happen.

Some embodiments use or provide a hardware and software combination which is configured for edit automation. The combination includes a digital memory, and a processor which is in operable communication with the memory. The processor is configured, e.g., by tailored software, to perform edit automation steps, which may include receiving a sequence of edits to a document at a location, identifying other locations where similar edits may be automated, and leveraging an edit automation functionality such as a transform that is more flexible than a naïve string replacement. Various tools and techniques for identifying locations appropriate for particular edits, for getting and leveraging transforms, for displaying recommendations, and for related technical solutions, are described, as are edit automation methods and configured devices.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 4 is a block diagram illustrating some aspects of some anchor target lists (ATLs);

FIG. 5 is a block diagram illustrating some aspects of text transform providers or text transforms that are suitable for use by or within an enhanced system configured with edit automation functionality;

FIG. 6 is a block diagram illustrating some aspects of some editing tool user interfaces;

FIG. 14 is an image of a formalization of an algorithm for generating temporal edit patterns from edits captured during one or more editing sessions; and FIG. 15 is a diagram illustrating edits to source code, with plus signs indicating added text and minus signs indicating removed or overwritten text.

DETAILED DESCRIPTION

Overview

Figure 1:
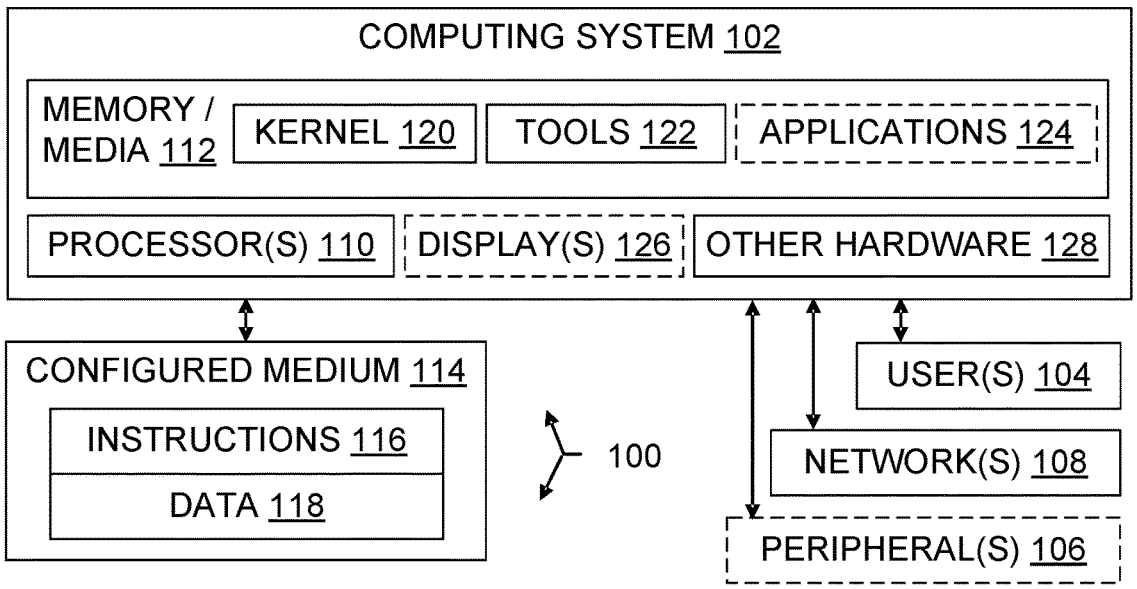
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by Microsoft innovators who recognized and faced technical challenges arising from their efforts to make source code editors more effective and easier to use.

For example, many editors provide users with a command to search a document for a specified string of characters, and to optionally replace one or more found instances with a different string. However, many desired changes to source code are not easily done using only a string search and replace. Making complete and correct edits can be especially difficult when the amount of source code is large (e.g., tens of thousands of lines) and the user is not familiar with that source code.

For instance, suppose a user wishes to implement a software library change by editing some source code to replace identifiers that involve a string like "fooConvert" into corresponding identifiers that involve "fooFastConvert". Suppose also that these changes should be made without breaking the code by changing any identifiers that closely resemble "fooConverse". Then the user could search for "fooConvert", which would find string matches "fooConverter" and "fooConvertor". These matches could be replaced by "fooFastConverter" and "fooFastConvertor", as desired. But the "fooConvert" string search would not find "fooConversion", which should also be changed. Searching for "fooConvers" would bring in "fooConversion", which is good, but it would also bring in the "fooConverse" identifiers, which should not be changed.

Moreover, it may be desired to add a parameter to a method, or to change parameter order, or do some other code refactoring either at or near a location where a string replacement is made. Because different identifiers may identify parameters at different locations, string replacement alone would be ineffective. Indeed, if applied uniformly, string replacements alone would likely break the code.

In some scenarios, a regex (regular expression) can be used to precisely describe the desired matches, and only the desired matches. But in practice users rarely write regexes, because of their complex and non-intuitive syntax and semantics. Moreover, a given user may not even realize that an editor supports regex-based search and replace. Asking the user to write a refactoring regex is also unlikely to improve user productivity and user satisfaction.

In short, in many scenarios, a precise set of desired changes to source code is not easily made using only a string search and replace. Sometimes an existing regex or refactoring functionality could help. But even when a helpful functionality is implemented for an editing tool, a user may not realize that the functionality exists, or know how to invoke it.

Similar considerations apply to some other desired changes to source code, such as renaming and certain kinds of insertions. Many focused editing functionalities have been implemented to rapidly make specific kinds of refactoring or other changes at a location in source code, accomplished automatically, e.g., with less typing by a user than would be required without applying the subtool at the location. For convenience, these focused editing functionalities are referred to herein as "subtools" of an editing tool. But in order to apply a subtool without the benefit of teachings herein, the user must know the subtool exists, and determine that applying it would be helpful, and know how to apply the subtool at the desired location in the document.

Accordingly, a set of technical challenges arise, involving subtool visibility and subtool invocation. One may view these as challenges arising from this technical question: How specifically may an editing tool facilitate invocation of appropriate editing subtools at appropriate times within an editing session, and at appropriate places within a document that is being edited?

The present disclosure provides answers to this question, in the form of edit automation functionalities which may be used in various combinations with one another, or alone, in a given embodiment. Determining appropriate places to apply a subtool, for example, may involve anchor target lists, temporal edit patterns, or both. Determining appropriate editing subtools, for example, may involve a transform provider, a library of automatable edit sequences, or both. Facilitating invocation of a subtool may involve, for example, staying within a current editing workflow. These and other functionalities are described herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, edit automation functionality could be installed on an air gapped network and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Figure 2:
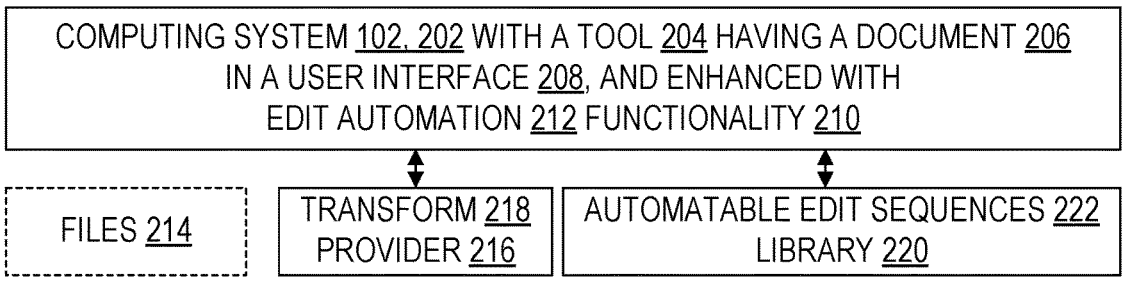
FIG. 2 is a block diagram illustrating aspects of a computing system which has one or more of the edit automation enhancements taught herein.

FIG. 2 illustrates a computing system 102 configured by one or more of the edit automation enhancements taught herein, resulting in an enhanced system 202. This enhanced system 202 may include a single machine, a local network of machines, machines in a particular building, machines used by a particular entity, machines in a particular datacenter, machines in a particular cloud, or another computing environment 100 that is suitably enhanced.

The illustrated system 202 includes a tool 204, which may be, for example, any tool 122 that also has editing functionality. A document 206 may be brought from a file 214 into the tool 204 for editing in response to input received through a user interface 208. The document 206 may also be displayed on a screen 126 by operation of the user interface 208. The illustrated system 202, and in particular the editing tool 204, is enhanced by the presence and operation of innovative functionality 210 that performs edit automation 212.

Edit automation 212 generally occurs, for example, when a tool 204 makes changes to the document in response to fewer keystrokes or other input gestures than would be required for a user to make the same changes without operation of the edit automation functionality 210. Edit automation 212 may be understood broadly, e.g., to include string find and replace, command macros, and some other familiar editing operations. However, teachings herein go much further, by providing edit automation functionalities 210 which were not previously available. Innovative edit automation functionality 210 may be used together with the edit automation 212 capabilities of non-enhanced systems, or in some instances as substitutes for such capabilities or enhancements of them.

Some edit automation functionality 210 taught herein includes or uses a transform provider 216, which provides a transform 218. Applying the transform 218 changes the document 206, or changes a copy of a portion of the document 206, or does both. A copy of a portion of the document 206 may be transformed to show a user what changes will be made if the transform 218 is applied to the document itself.

Some edit automation functionality 210 taught herein includes or uses a library 220 of automatable edit sequences 222. A given entry in the library 220 includes an edit graph 302 data structure and one or more corresponding temporal edit patterns (TEPs) 304. When the system 202 matches the edit graph 302 to user inputs, the system may recommend that a corresponding TEP be applied to make changes in the document 206. The TEP 304 may thus be viewed as a kind of transform 218, but it is one that is associated with an edit graph 302. Other transforms 218 are not necessarily associated with an edit graph; a transform 218 may be synthesized from a textual example of a desired find-replace pair, for instance.

A given enhanced system 204 may include or use a transform provider 216, or may include or use a library 220 of automatable edit sequences 222, or may do both. Other edit automation functionality 210 taught herein may also, or instead, be present in a given enhanced system 204.

Figure 3:
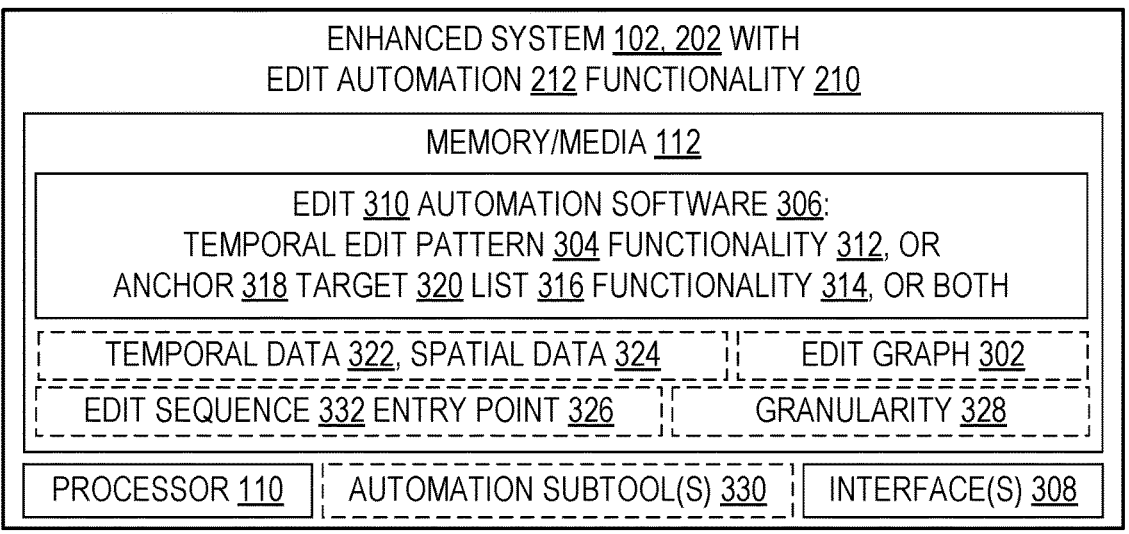
FIG. 3 is a block diagram illustrating an enhanced system configured with edit automation functionality, such as a temporal edit pattern functionality or an anchor target list functionality, or both.

FIG. 3 illustrates an enhanced system 202 which is configured with software 306 to provide edit automation functionality 210. For example, software 306 may perform a method illustrated in FIG. 13 (which incorporates FIGS. 8 through 10). In particular, software 306 may automate edits 310 by using temporal edit pattern functionality 312, or anchor target list functionality 314, or both. Edit automation 212 may include recommending the use of one or more automation subtools 330 to a user who did not expressly look for those subtools (and may not even have known they exist). Edit automation 212 may even apply subtools without expressly identifying them to a user as distinct subtools 330.

A temporal edit pattern 304 is a generalization data structure which represents a group of document edits 310. That is, the TEP 304 may have a coarser granularity 328 than a recording of each edit 310 as it occurred. A TEP 304 may be applied to perform edits at one or more locations, with more flexibility than a simple string find-replace operation.

A TEP 304 may contain one or more edit sequence entry points 326, representing different edit sequences that ultimately accomplish the same changes. For instance, a TEP 304 for removal of a parameter may have a first entry point 326 which removes the parameter from a method's list of arguments and then removes uses of the parameter within the method's body, and also have a second entry point 326 which removes uses of the parameter within the method's body and then removes the parameter from the method's list of arguments.

Edits 310 may be represented using data structures that track edit operation order and also track edit operation location. Edit operation order is temporal data 322, e.g., timestamps, or sequential numbers, or a list of recent edit operations, or other temporal context. Edit operation location is spatial data 324, e.g., a filename, a line number from the start of the file, a character position or index from the start of the line, or other cursor position data.

An anchor target list (ATL) 316 is a list of document locations, including an anchor location 318 and one or more target locations 320. After a transform 218 is obtained based on edits at the anchor 318, the transform may be applied at some or all of the targets 320. The transform 218 may be more flexible than a simple string find-replace operation. The targets 320 may be identified by a string search, or by any operation that produces a list of document locations. For instance, the list 316 may be (or be extracted from) a list of error locations or warning locations generated by a compiler, or a list of results from a structural search. A structural search is a search that understands source code tokens such as method calls or source code structures such as loops, as opposed to a string search that treats source code as merely a string of characters.

The enhanced system 202 may be networked through an interface 308. An interface 308 may include hardware such as network interface cards, software such as network stacks, APIs, or sockets, combination items such as network connections, or a combination thereof.

FIG. 4 shows some aspects of some anchor target lists 316. This is not a comprehensive summary of all list aspects or of every list 316. These items are discussed at various points herein, and additional details regarding them are provided in the discussion of a List of Reference Numerals later in this disclosure document.

FIG. 5 shows some aspects of some transforms 218 or transform providers 216 or both. This is not a comprehensive summary of all aspects of transform provision or use. These items are discussed at various points herein, and additional details regarding them are provided in the discussion of a List of Reference Numerals later in this disclosure document.

FIG. 6 shows some aspects of some user interfaces 208. This is not a comprehensive summary of all user interface aspects, or of every user interface 208. These items are discussed at various points herein, and additional details regarding them are provided in the discussion of a List of Reference Numerals later in this disclosure document.

Figure 7:
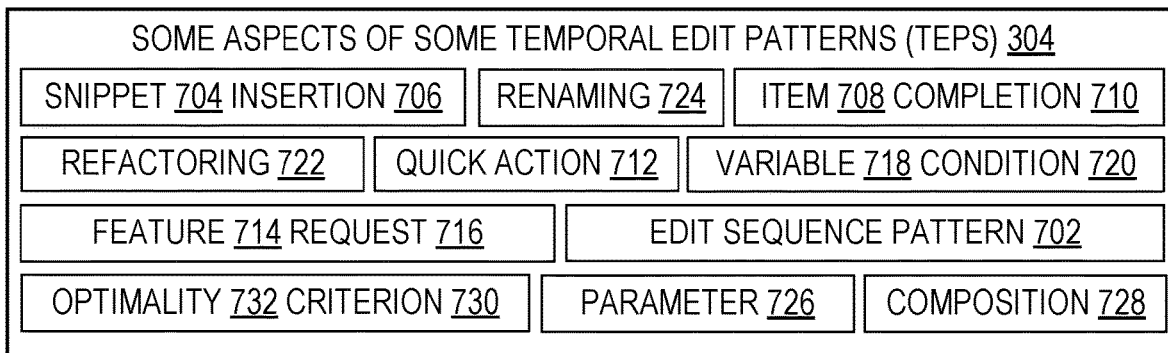
FIG. 7 is a block diagram illustrating some aspects of some temporal edit patterns (TEPs)

FIG. 7 shows some aspects of some temporal edit patterns 304. This is not a comprehensive summary of all TEP aspects, or of every TEP 304. These items are discussed at various points herein, and additional details regarding them are provided in the discussion of a List of Reference Numerals later in this disclosure document.

In some embodiments, an ATL-enhanced system 202 watches the edits that are made at one location (the anchor 318), obtains a list 316 of other locations as targets 320, gets a transform 218 for making similar edits, and then recommends the transform to the user, or applies the transform, or does both, at one or more listed targets. Thus, some embodiments use or provide a functionality-enhanced system, such as system 202 or another system 102 that is enhanced as taught herein. In some embodiments, an enhanced system which is configured to receive an edit sequence at one location and then automatically recommend or apply similar editing at another location includes a digital memory 112, and a processor 110 in operable communication with the memory. The processor 110 is configured to perform editing automation steps. As noted elsewhere herein, digital memory 112 may be volatile or nonvolatile or a mix. The steps include (a) receiving 802 an edit sequence 332 representing contiguous edits 310 corresponding to an anchor location 318 of a document 206 in a tool 204, (b) obtaining 804 a list 316 of targets 320 located at respective target locations in the document other than the anchor location, (c) submitting 806 the edit sequence to a transform provider 216, (d) getting 808 from the transform provider a corresponding transform 218, and (e) leveraging 810 the transform by applying 812 the transform to at least one target or by recommending 814 an application of the transform to at least one target, or both.

One of skill will acknowledge that the user edits 310 which are given to the transform provider could match a known pattern 702, such as a known refactoring pattern, or they might not match any available pattern. If they don't match any known pattern then the edits can still be fed to a PROSE synthesizer or a similar transform synthesizer 502 which serves as a transform provider 216.

Some embodiments include the transform provider 216, as opposed to merely communicating with it. In some, the transform provider includes at least one of the following: a transform synthesizer (e.g., SynthesizeCodeTransform( ) in an algorithm FindReplaceSynthesis disclosed herein), or an automatable edit sequences library 220 containing temporal edit patterns 304 paired with edit sequence identification mechanisms, e.g., edit graphs 302.

A target list 316 may result from a user action that normally provides a list, e.g., a find command. However, in some embodiments, the list 316 may also be obtained as a side-effect without such a user action, e.g., a list 316 may be created as a side-effect of compilation 416. In some embodiments, the list 316 of targets includes at least one of the following: a list of string search 402 results 404, a list of source code 430 structural search 406 results 408, a list of designated 410 locations 412, a list of compilation errors 418 or compilation warnings 420 or both, or a list of errors 418 or warnings 420 or both generated by a software development 422 tool 424 processing the document.

In some embodiments, the target list 316 is editable 426 by a user. Feedback 512 from user editing may be submitted 806 to the transform provider to further refine the transform recommendations.

In some embodiments, the target list 316 is automatically clustered 428. In some, the user may edit the clustering, and in some of those, feedback 512 from user editing may be used to further refine the clustering.

In view of teachings herein, one of skill will acknowledge that some UI mechanisms 602 are more intrusive 604 upon a developer's current workflow 606 than other UI mechanisms. For example, requiring that a developer open another window and do a keyword search to locate potentially useful subtools 330 is much more intrusive than matching 1312 edits 310 at an anchor 318 to an edit graph 302 and then recommending 814 a particular refactoring subtool 330 from a library 220 be applied to automate similar edits at additional locations 414.

Somewhat more generally, one possible ranking 608 of UI mechanisms 602 according to their respective intrusiveness 604 follows. In this ranking example, "<<" means "less intrusive than": completion list <<light bulb <<link or squiggle that opens a pop-up<<diff view <<pop-up modal dialog box or code lens pop-up or other pop-up<<displaying a list of locations (multi-location action UI)<< a tool menu search <<link that opens a separate window. One of skill will acknowledge that other rankings 608 are also possible. Some embodiments favor less intrusive UI mechanisms 602, and this preference against intrusion may be implemented regardless of the particular ranking 608 that is used to assess UI mechanism intrusiveness.

Some embodiments include a confidence score 504 which is associated with a recommended application 610 of a transform or with the transform itself. The confidence score 504 may be generated by the transform provider 216 together with the transform 218, for example. In some embodiments, the confidence score 504 is correlated by the embodiment with a choice of UI mechanism 602 based at least in part of the UI mechanism's absolute or relative intrusiveness 604. UI recommendation 610 presentation 612 mechanisms 602 are ranked 608 according to their intrusiveness 604. When the confidence score indicates greater confidence, a more intrusive UI mechanism may be used than when the confidence score indicates lesser confidence. The leveraging 810 utilizes a user interface recommendation presentation mechanism which is chosen based on at least the confidence score.

In some embodiments, a list of string search results or other list 316 is partitioned into one or more anchor locations and one or more target locations. In this example, an anchor location 318 is one edited by the user; there may be multiple anchors. The user editing is recorded. In this example, a target location 320 is a non-anchor location where a transform is recommended or applied; the transform is based on the edits made by the user at the anchor(s). Under a slightly different terminology that is not preferred here, all of these locations are anchors. Such variation in terminology does clarify that user edit recording is only needed at some locations—maybe only one location, although recording may also be done at other locations.

In some embodiments, a TEP-enhanced system 202 recognizes automatable edits 222 using a library of temporal edit patterns 304, and then leverages 908 the edit pattern. Thus, some embodiments use or provide a functionality-enhanced system, such as system 202 or another system 102 that is enhanced as taught herein. In some embodiments, an enhanced system which is configured to recognize an automatable edit sequence includes a digital memory 112, and a processor 110 in operable communication with the memory. The processor 110 is configured to perform editing automation steps. The steps include (a) receiving 902 an edit sequence 332 representing contiguous edits 310 of a document 206 in a tool 204, including temporal data 322 and spatial data 324 for each edit, (b) building 904 an edit graph data structure 302 from the edit sequence using the temporal data and spatial data, the edit graph having coarser granularity 328 than the edit sequence, (c) matching 906 at least a portion of the edit graph data structure to a TEP 304 in an automatable edit sequences library 220, and (d) proactively leveraging 908 the TEP in the tool. Matching 906 may match the edit graph that is built contemporaneously from user edits to a preconstructed edit graph 302 that resides in the library 220 and is associated in the library with the TEP 304, for example.

In some embodiments, the TEP represents multiple edit sequence patterns 702, and the TEP has at least two entry points 326 corresponding respectively to different edit sequence patterns of the TEP. A toolsmith may be less interested in any single sequence than in a summary of all sequences used by developers to perform a given refactoring, renaming, or other logical edit. Hence, apart from finding the edit sequence pattern at the right granularity and generalization in one session, some embodiments provide or use a summary across multiple sessions of sequence patterns, as a single TEP that represents multiple ways of performing the same logical edit.

With some embodiments, the document 206 contains source code 430, and the TEP represents at least one of the following: a snippet 704 insertion 706, an item 708 completion 710, a quick action 712, a feature 714 request 716, a variable 718 condition 720. With some, the TEP represents at least one of the following: a refactoring 722, or a renaming 724. A given embodiment may include any number of any of these various kinds of TEPs 304; the grouping of TEPs 304 in the current paragraph is illustrative, not prescriptive.

Some embodiments use or provide a diff view 614 in the user interface for presentation 612 of recommendations 610. The diff view may be with or without buttons 616 for performing actions 618 to accept, reject, or otherwise perform a user's indicated response to a recommendation. In a diff view, a result of accepting the recommendation is shown inline or in an adjacent line 626, and is visually distinguished by color, font, bold, italic, or otherwise. In the following example, the source code that will be replaced is shown in strike-through format, and is followed on the line by the code that will replace it:

Node (str id) {

A diff view may omit buttons 616, e.g., when keys are designated to indicate accept or reject actions, e.g., tab means accept the recommendation and space means reject the recommendation. After acceptance, the code would look like this:

Node (str id) {

After rejection, the code would look like this:

Node ( ) {

The same recommendation is shown in the following variant diff view, which does display buttons, to be actuated by the indicated bold capital letters: accept all in File|Reject all|accept all in Project Node (str id) {

With some embodiments, the document 206 contains source code 430, the tool 204 includes a user interface 208, and leveraging 908 the TEP in the tool includes the user interface displaying a diff view 614 inline with at least a portion of the source code, the diff view representing a result of applying the TEP 304 automatically to the source code portion or to a copy of the source code portion.

Other system embodiments are also described herein, either directly or derivable as system versions of described processes or configured media, duly informed by the extensive discussion herein of computing hardware.

Although specific edit automation architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different technical features, aspects, mechanisms, operational sequences, data structures, or other functionalities for instance, and may otherwise depart from the examples provided herein.

Processes (a.k.a. Methods)

Figure 8:
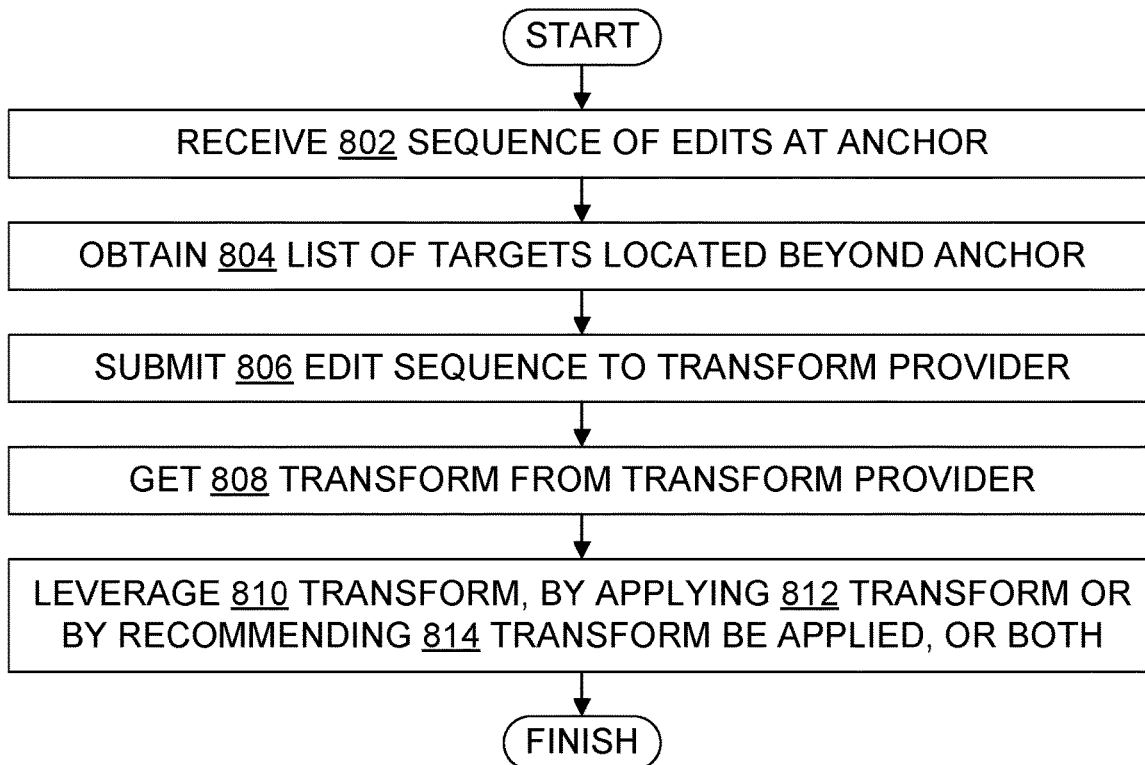
FIG. 8 is a flowchart illustrating steps in some edit automation methods that use one or more anchor target lists.
Figure 9:
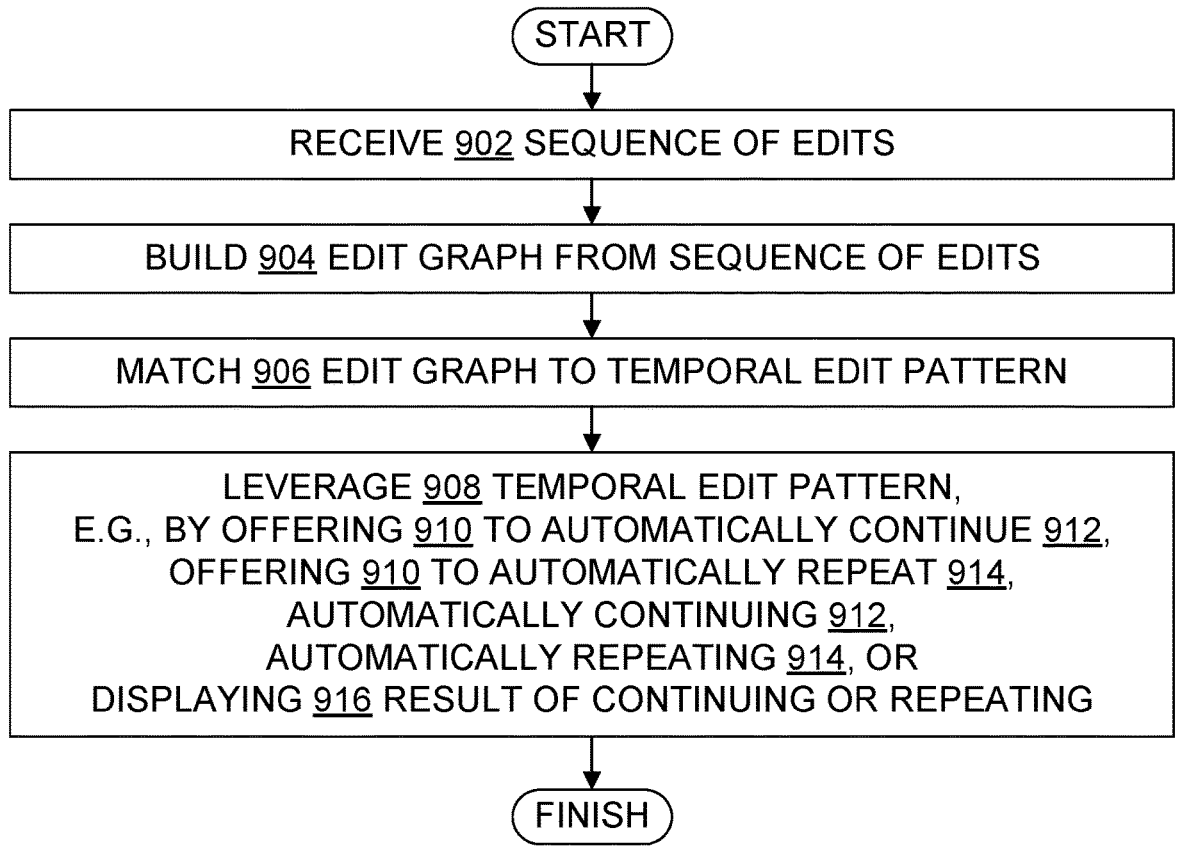
FIG. 9 is a flowchart illustrating steps in some edit automation methods that use one or more temporal edit patterns.
Figure 10:
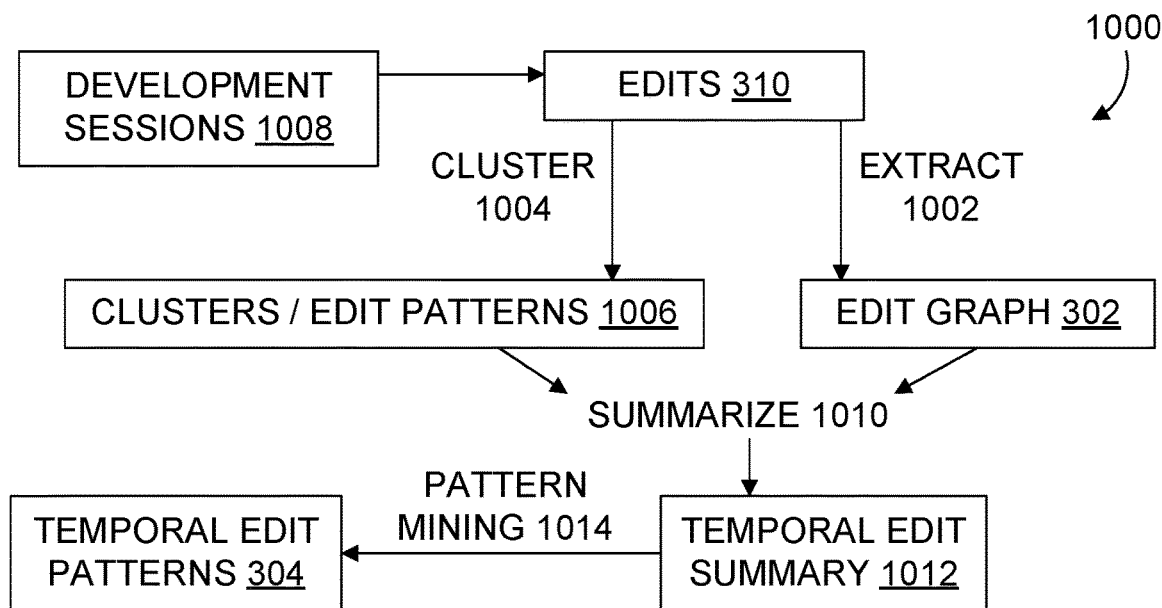
FIG. 10 is a flowchart illustrating steps in some edit automation methods for producing temporal edit patterns.
Figure 13:
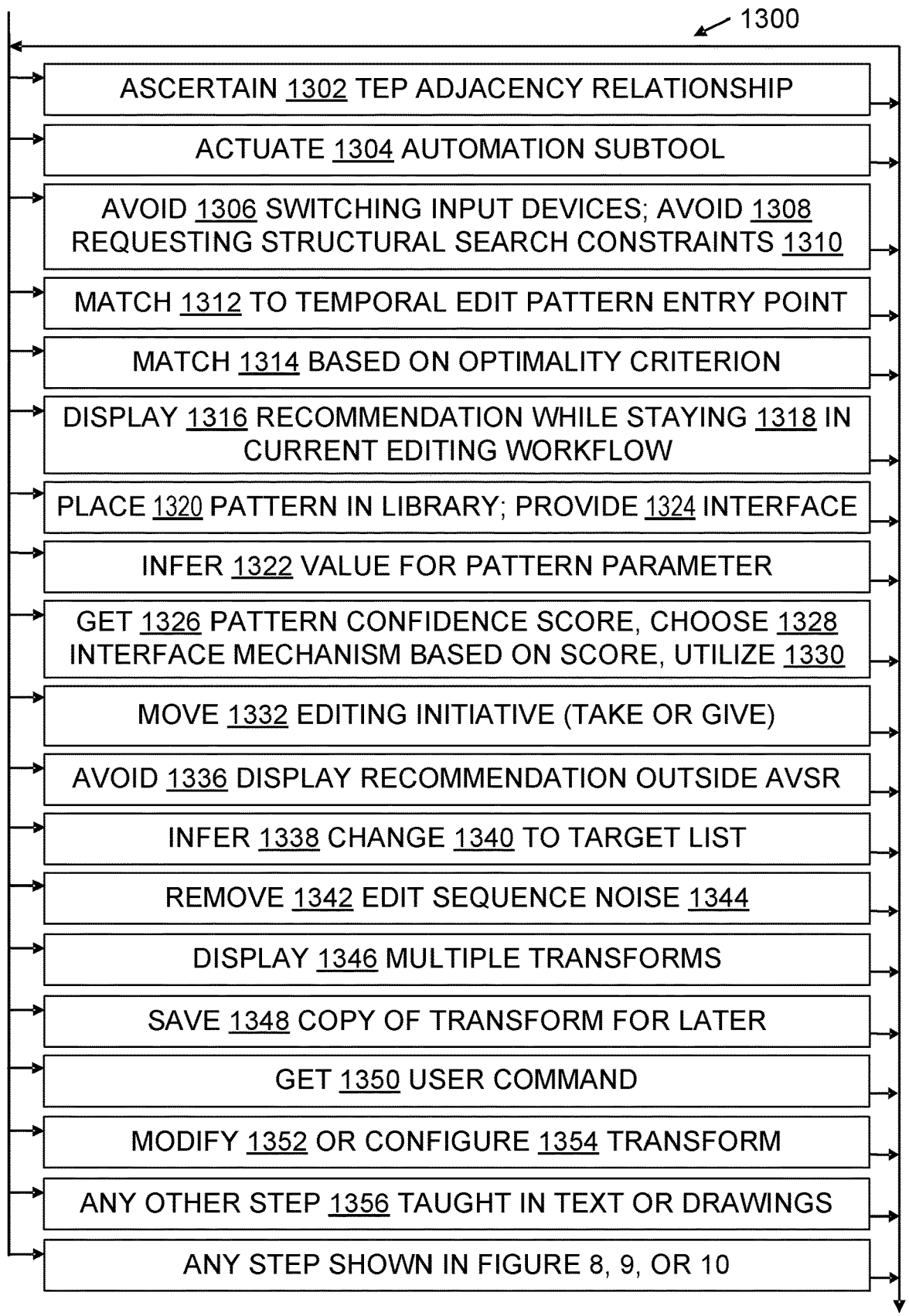
FIG. 13 is a flowchart further illustrating steps in some methods for edit automation, incorporating FIGS. 8, 9, and 10.

FIGS. 8 through 10 illustrates families of methods 800, 900, 1000 that may be performed or assisted by an enhanced system, such as system 202 or another edit automation functionality enhanced system as taught herein. FIG. 13 further illustrates edit automation methods (which may also be referred to as "processes" in the legal sense of that word) that are suitable for use during operation of a system which has innovative functionality taught herein. FIG. 13 includes some refinements, supplements, or contextual actions for steps shown in FIGS. 8 through 10, and incorporates the steps of those Figures as options.

Technical processes shown in the Figures or otherwise disclosed will be performed automatically, e.g., by an enhanced editor 204, a subtool 330, or a transform provider 216, unless otherwise indicated. Processes may also be performed in part automatically and in part manually to the extent action by a human person is implicated, e.g., in some embodiments a human may manually decide the scope of automated edits (e.g., transform one location, all locations in a file, or all locations in a project), but no process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 8 through 10. Steps may be performed serially, in a partially overlapping manner, or fully in parallel. In particular, the order in which flowchart 800, 900, 1000, or 1300 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide editing method suitable for performance by a software tool having a user interface, including the following steps: receiving 802 via the user interface an edit sequence representing contiguous edits corresponding to an anchor location of a source code document in the software tool; obtaining 804 a list of targets located at respective target locations in the source code document other than the anchor location; submitting 806 the edit sequence to a transform provider; getting 808 from the transform provider a corresponding transform; and leveraging 810 the transform by applying 812 the transform to at least one target or by recommending 814 application of the transform to at least one target, or both.

In some embodiments, leveraging the transform stays within a current editing workflow 606 in at least one of the following ways: by avoiding 1306 switching between input devices 620 while receiving a user input which accepts, rejects, or modifies a displayed recommendation to apply the transform (e.g., no switching between mouse and keyboard); avoiding 1308 requesting structural search constraints 1310 from the user (e.g., no need to fill in a checklist); or avoiding 1336 displaying, outside of an ambient visualization screen region 622 of the user interface, any recommendation 610 to apply the transform (e.g., avoid 1336 recommendations in popups or separate windows but allow them in completion lists and diff views).

Some embodiments automatically infer 1338 from user input at least one of the following changes 1340: a deletion from the target list (e.g., user didn't like that target, so remove this similar target); an addition to the target list (e.g., user liked that target, so add this similar target); an ordering of the target list (e.g., user moved these targets to the top, so move these similar targets up higher as well or move these dissimilar target further down, or do both); or a clustering of the target list (e.g., user moved these targets together, so move these similar targets into that cluster, or move these dissimilar targets out of the cluster, or form another cluster using the inferred clustering criterion, e.g., method name, kind of loop, or other structural constraint 1310).

Some embodiments remove noise from transform producer input. For example, some methods include removing 1342 edit sequence noise 1344 in at least one of the following ways: removing from the edit sequence edits that correspond to a typographical error correction (e.g., edits such as reversing transposed characters, switching case, changing only one character in an identifier, or adopting a spellchecker recommendation); or removing from the edit sequence edits that occur while recording has been paused by a user (a pause means "transform producer, don't learn from edits made during the pause").

In practice, in at least some scenarios with some embodiments, there is an optimal range of the number of edit locations, for using the machine intelligence or other capabilities of a transform producer, or using a subtool or other transform. This is a list length 432 range in which there are too many locations to easily make changes manually, and too few locations to justify writing a new subtool from scratch. For example, in some scenarios with some embodiments the list 316 of targets includes at least three target locations 414 and no more than forty target locations, and the transform provider 216 either provides a synthesized transform 218 or provides a transform that is associated with (e.g., an invocation of) a subtool 330 that has not been previously used in a current editing session.

Some embodiments display, and optionally retain, recommended transform(s) 218, e.g., as a regex or script. This may increase user confidence and trust in the recommendation, and also allows re-use of the transform in other contexts, e.g., other projects, such as for antipattern elimination. Some embodiments include displaying 1346 a set of multiple transforms in the user interface, with all transforms in the set being based at least in part on the edit sequence submitted to the transform provider. Some embodiments include saving 1348 a copy of the transform in a digital format which allows subsequent use or reuse of the transform.

In the diff view or another view, buttons or other UI mechanisms may be displayed to receive user commands 624. In some, leveraging 810 or 908 includes recommending application of the transform to at least one target, and the method further includes at least one of the following: getting 1350 via the user interface an accept command, and applying 812 the transform to the target; getting 1350 via the user interface a reject command, and avoiding applying the transform to the target; or getting 1350 via the user interface a modify command, modifying 1352 the transform into a modified transform, and applying 812 the modified transform to the target.

In some embodiments, a user's workflow entry to the edit automation functionality is through a string search 402. A pattern match synthesizer 216 may generalize from one search result 404 to expand the search results, e.g., by synthesizing a regex 506. In some embodiments, the list of targets includes a string search result from a string search performed on a text-to-find example 510 received via the user interface, and the method includes submitting 806 the text-to-find example to a pattern match synthesizer, getting 808 from the pattern match synthesizer a corresponding pattern match code 506, and performing a pattern matching search 402 of the source code document, thereby finding one or more pattern match instances 508 in the document, and displaying 1316 at least one pattern match instance in the user interface, or adding 1340 at least one pattern match instance to the target list, or both. Pattern match instances could be added automatically to the other search results as targets, or the user could say whether to add pattern match instances as targets that will then be subject to the transform.

Some embodiments, automatically apply 812 the transform to at least one target in each of a plurality of files 214. For instance, after a few edits by a user, an enhanced editor may start suggesting changes in all files of a directory, or all files of a project. The user may review a few of the suggestions, decide they look correct, and then accept all of them.

In some embodiments, leveraging 810 or 908 includes recommending 814 application of a transform to at least one target, and recommending includes displaying a diff view 614 of a target at least partially on a same line 626 as the target.

Some embodiments us or provide a method for recognizing an automatable edit sequence, including: receiving 902 an edit sequence representing contiguous edits of a source code document in a tool, including receiving temporal data and spatial data for each edit; building 904 an edit graph data structure from the edit sequence using the temporal data and spatial data, the edit graph having coarser granularity than the edit sequence; matching 906 at least a portion of the edit graph data structure to a first TEP in an automatable edit sequences library; and proactively leveraging 908 the first TEP in the tool. The qualifier "first" is used here merely to distinguish one TEP from other TEPs; it is not intended to mean "first" in a positional or temporal sense. Receiving 902 differs from receiving 802 in that receiving 902 does not necessarily occur at an anchor 318, while receiving 802 is presumed to occur at an anchor.

In some embodiments, leveraging the first TEP in the tool includes at least one of the following: offering 910 to automatically continue 912 at least a portion of the edit sequence at a current location in the source code document (e.g., an enhanced system finishes a refactoring that the user started, such as by applying 812 a transform); offering 910 to automatically repeat 914 at least a portion of the edit sequence at a different location in the source code document; displaying 916 a result of automatically continuing the edit sequence to a copy of a portion of the source code at the current location in the source code document (e.g., using a diff view or another presentation mechanism 602); displaying 916 a result of automatically repeating the edit sequence to a copy of a different portion of the source code at the different location in the source code document; automatically continuing 912 at least a portion of the edit sequence at the current location in the source code document; or automatically repeating 914 at least a portion of the edit sequence at the different location in the source code document. An offering 910 is an example of a recommendation 610, as is a displaying 916.

Some embodiments generate 1000 a TEP 304. This may include building 1002 a multi-session edit graph data structure 302, forming 1004 hierarchical clusters 1006 in the multi-session edit graph data structure, summarizing 1010 edit information at a hierarchical cluster level, and mining 1014 summarized edit information to produce the first TEP. Additional detail regarding TEP generation is provided herein in a section titled "Mining Temporal Patterns in IDEs".

In some embodiments, TEP composition 728 is supported, and in some TEP repetition 914 is supported. A distinction is made here between TEP composition and TEP repetition. An example of TEP composition is a property code snippet insertion TEP followed by a variable deletion TEP, while an example of a TEP repetition is applying this composition at multiple locations in a file (or in a set of files). For definitional clarity, entering a TEP X at one entry point 326 and then entering the same TEP X at a different entry point is considered a repetition of TEP X. Also, applying TEP X with a first parameter value p1 and then applying TEP X with a different parameter value p2 is considered a repetition of TEP X. In particular, when location in the file is a TEP parameter 726, changing between locations does not inherently change between TEPs. The parameter values would differ each time, but the underlying transformation is the same, so it is a repetition.

Some embodiments include ascertaining 1302 that the first TEP has been a contiguous predecessor of a second TEP and in response to the ascertaining, proactively leveraging 908 the second TEP in the tool after proactively leveraging 908 the first TEP in the tool. A predecessor is an example of an adjacent TEP 304. Two TEPs X and Y are adjacent if performance of X overlaps, is interwoven with, immediately precedes, or immediately succeeds, performance of Y. In a composition 728 of TEP X and TEP Y, X and Y would typically be adjacent one another.

Some embodiments facilitate subtool 330 discovery, which may occur as application 812 of the subtool without explicitly identifying the subtool by name to a user, or the subtool may be identified by its intended result, for example. A wide variety of subtools may be discovered using an embodiment. In some embodiments, leveraging 908 the first TEP in the tool includes at least one of the following: recommending 814 a refactoring subtool 722, 330 for use in the source code document; recommending 814 an automation subtool 330 for use in the source code document (any edit automation tool); recommending 814 a set of automation subtools for use in the source code document (e.g., a composition 728, when no single available subtool will accomplish the desired editing result but several subtools composed together will do it, or at least get closer to the desired result); actuating 1304 a refactoring subtool in the source code document; actuating 1304 an automation subtool in the source code document; or actuating 1304 a set of automation subtools in the source code document.

In some embodiments, a TEP 304 may have multiple entry points 326 to the recognized pattern. This provides flexibility in recognizing different editing preferences. For example, there are different ways to make a constructor for a class; a developer may start with a constructor argument list, or start with fields, or start with initialization. A TEP 304 for making a constructor could thus have three entry points 326. Such TEPs provide embodiments with more flexibility and scope than edit automation approaches that assume a linear order, e.g., left-to-right typing order or word order Markov-based approaches. Specifically, in some embodiments a TEP has multiple entry points, and matching 906 includes matching the portion of the edit graph data structure to an entry point.

Some embodiments facilitate, allow, or favor staying within a current editing workflow 606. This may be accomplished, e.g., by not switching input devices (mouse v. keyboard), staying within an ambient visualization area 622, and using acceptable in-flow adornments such as diff view or autocompletion list or refactoring annotation or pop-up instead of flow-breaking adornments such as a light bulb or a separate window or file or a dialog box. Accordingly, in some embodiments leveraging 908 the first TEP in the tool occurs while staying 1318 within a current editing workflow. One advantage of staying in a workflow is that the traditional functionalities within the flow remain available, e.g., source code formatting and autocompletion are available in-flow in some IDEs but not available in a separate window or other out-of-flow context.

Some embodiments generate 1000 TEPs instead of relying on manual creation of edit automation tools. This potentially doubles, triples, or even more substantially increases the number of available subtools 330 in a given IDE or other tool 424. An order of magnitude increase over the course of a year is realistic. Meanwhile, dozens of TEPs are described herein. In some embodiments, the automatable edit sequences library 220 includes at least twenty TEPs produced automatically from summarized edit information, including at least five multi-entry-point TEPs.

Some embodiments match 1314 user edits to TEPs based on one or more optimality criteria 730. An optimal 732 TEP is favored, e.g., by being recommended before other TEPs, or by visual highlighting, or a displayed ranking of TEPs. More than one TEP may be optimal in a given situation. What is optimal may be defined using various criteria 730, e.g., an optimal TEP may be the TEP (in the set of relevant TEPs) that does the largest number of operations, the TEP that has the most entry points, the TEP that has the most composition successors, the TEP that is most frequently used, the TEP has express guarantees such as unchanged code functionality despite refactoring, or the TEP that has been put on a preference list for the development team, etc. Accordingly, in some embodiments matching 906 the portion of the edit graph data structure to the first TEP includes selecting 1314 the first TEP based on an optimality criterion 730.

In some situations, a user may want to configure 1354 a refactoring tool 330 or another subtool 330 before applying it, e.g., reorder parameters of a constructor for better readability. This claim covers refactor tool configuring, but is not limited to refactor tools. In some embodiments, leveraging 908 the first TEP in the tool incudes configuring 1354 an automation subtool and then actuating 1304 the automation subtool in the source code document.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as anchor target lists 316, temporal edit patterns 304, edit graphs 302, transforms 218, libraries 220, clusters 1006, temporal data 322, spatial data 324, or edit automation software 306, in the form of data 118 and instructions 116, read from a removable storage medium 114 and/or another source such as a network connection, to form a configured storage medium. The configured storage medium 112 is capable of causing a computer system 102 to perform technical process steps for edit automation, as disclosed herein. The Figures thus help illustrate configured storage media embodiments and process (a.k.a. method) embodiments, as well as system and process embodiments. In particular, any of the process steps illustrated in FIG. 8, 9, 10, or 13, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a computing system to perform an editing method. This method includes: receiving 802 an edit sequence representing contiguous edits corresponding to an anchor location of a document in a tool; obtaining 804 a list of targets located at respective target locations in the document other than the anchor location; submitting 806 the edit sequence to a transform provider; getting 808 from the transform provider a corresponding transform; and leveraging 810 the transform by applying the transform to at least one target or by recommending application of the transform to at least one target, or both, said leveraging performed within a single editing workflow.

In some embodiments, the system 202 operates as a mixed initiative system in at least one of the following ways: an editing initiative 628 moves 1332 between a user and the system as iterations of the editing automation steps are performed, or the editing initiative moves between the user and the system as the system acquires user feedback 512 in response to leveraging the transform.

In some embodiments, the method includes: obtaining a user feedback 512 about the transform; submitting 806 a refinement constraint to the transform provider, the refinement constraint being based on the user feedback; getting 808 a refined transform from the transform provider; and leveraging 810 the refined transform. The refinement constraint may include, e.g., user edits to a transform, or user acceptance or rejection of a transform, and the feedback 512 may be positive or negative or a mix of both.

In some embodiments, the user feedback 512 includes at least one of the following: an undo request 630 to undo at least part of an application 812 of the transform; an edit to a transformed target; at least two rejections of recommended applications of the transform (not necessarily in a row); or a cancelation or dismissal of the transform (e.g., reject all, or reject the rest of the suggested locations from here on). An edit to a transformed target may occur when the user accepted a transform but then revised the result of applying the accepted transform. For instance, a user may initially command transformation of all constructors within a file, but then pause the command and refine it by limiting transformation to only public constructors.

In some embodiments, leveraging 810 the transform stays 1318 within a current editing workflow 606 at least by avoiding 1308 requesting structural search constraints 1310 from the user.

Some embodiments use or provide a computer-readable storage medium 112, 114 configured with data 118 and instructions 116 which upon execution by at least one processor 110 cause a cloud computing system to perform a method for recognizing an automatable edit sequence. This method includes: receiving 902 an edit sequence representing contiguous edits of a source code document, including receiving temporal data and spatial data for each edit; building 904 an edit graph data structure from the edit sequence using the temporal data and spatial data, the edit graph potentially having a coarser or finer granularity than the edit sequence; 1004 forming hierarchical clusters in the edit graph data structure; summarizing 1010 edit information at a hierarchical cluster level; mining 1014 summarized edit information 1012 to produce a first TEP; placing 1320 the first TEP in an automatable edit sequences library; and providing 1324 an interface 514, 308 to the automatable edit sequences library for proactively leveraging the first TEP.

Some embodiments include UI functionality for taking action in the flow 606, e.g., on-object buttons 616 in a diff view 614. In some embodiments, the method includes displaying 910 a recommendation of the first TEP in a tool while staying 1318 in a current editing workflow 606, the recommendation 610 including action buttons 616 which indicate actions 618 available in response to the recommendation.

Some embodiments include machine learning functionality for inferring values for refactor parameters or rename parameters, or other transform parameters 726, from user edits. In some embodiments, the method includes inferring 1322 a value for a parameter of the first TEP from the edit sequence.

Some embodiments include functionality for choosing a recommendation UI mechanism 602 whose intrusiveness 604 corresponds to the confidence 504 the system has that a particular recommendation will be adopted by the user. In some embodiments, the method includes getting 1326 a confidence score for the first TEP which represents confidence that the first TEP will be actuated, choosing 1328 a recommendation presentation mechanism based on at least the confidence score, and utilizing 1330 the recommendation presentation mechanism to display a recommendation for actuation of the first TEP.

Some embodiments placing 1320 TEPs in the automatable edit sequences library 220, such that the automatable edit sequences library includes TEPs which collectively represent at least N of the following: a snippet insertion 706, an item completion 710, a quick action 712, an implemented feature request 716, a variable condition 720, a refactoring 722, or a renaming 724. Depending on the embodiment, the value of N may be in a range from zero (embodiments that use only existing library entries without placing additional entries in the library) to seven.

Additional Examples and Observations, Generally

Additional support for the discussion of edit automation herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, additional examples and observations are offered.

Relationship Between ATL and TEP

The various edit automation enhancements taught herein may be grouped in various ways to form embodiments. For example, some enhancements focus on the user interface or user experience, while others are directed more at internal data structures and algorithms. Another possible organization places ATL enhancements in one group and TEP enhancements in another group. For instance, some embodiments use or provide an anchor-target-list (ATL) system, which might also be referred to as an "on-the-fly find-replace system" in particular cases, while other embodiments use or provide a temporal edit pattern (TEP) system, which might also be referred to as an "on-the-fly refactoring system" in particular cases. However, a given embodiment may also include both ATL and TEP functionality.

TEP functionality.

In some embodiments, an edit sequence from user editing at an anchor location in an ATL-enhanced system can be used to build an edit graph per a TEP system, which is then used to match a TEP, which is then used in the ATL-enhanced system as a transform at non-anchor target locations. Unlike a TEP-only system, an ATL system does not necessarily continually monitor user edit sequences as it waits for one that matches a TEP. Instead, the ATL system may use whatever edit sequence occurs at the anchor. If that anchor edit sequence matches a TEP, then a transform from the library of TEP transforms can be used. If the anchor edit sequence does not match any known TEP, the edit sequence can still be submitted to a transform synthesizer (e.g., PROSE) to generate a transform.

In some embodiments, a TEP-enhanced system continually monitors user edit sequences as it waits for one that matches a TEP. Along the way, it may encounter activities that generate an anchor or a target list, e.g., searches, compilations. But they have no special significance to TEP functionality unless they match a library 220 entry. On the other hand, such a TEP system may also encounter activities that may be overlooked in an ATL system but do have significance in the TEP system, such as a refactoring that starts without any immediately preceding search or compilation to generate a target list.

Mining Temporal Patterns in IDEs

Temporal edit patterns (TEPs) can help build tools that combine temporal and spatial contexts to provide the right recommendation in the right location at the right time. Integrated Development Environments (IDEs) offer developers an overwhelming deluge of tools to support source code editing tasks, including writing new code, performing refactorings, and applying code fixes. Popular IDEs provide many specific subtools 330 to perform refactorings, code fixes, and snippet insertion. But developers have difficulty discovering these tools and applying them at the appropriate time and place.

While they are very useful, spatial context based subtools do not have the temporal context to precisely determine when they are applicable. Hence, at any point, a significant fraction of these tools produce suggestions, often obscuring the desired one. Further, there are entire classes of recommendations that cannot be expressed in a purely spatial context. Building tools that exploit both temporal and spatial signals is challenging. First, recognizing these signals has been largely a manual process, without any data-driven approaches to recognize temporal patterns and how they interact with spatial signals. Second, developers use multiple, diverse strategies to make the same change, which makes it difficult for toolsmiths to systematically understand and catalog what edits developers perform in practice. Third, it is difficult for toolsmiths to discover potentially valuable recommendations that do not currently exist, when constrained to relying on manual bug reports or feature requests.

Some embodiments herein use or provide a technique for mining temporal patterns in sequences of edits applied in an IDE. Some represent the fine-grained sequences of code edits applied in an IDE as a graph 302 that captures temporal and spatial relationships among the edits. Some lift this temporal and spatial information to a more general representation, and some report the common patterns, for toolsmiths to explore or for use in building libraries 220.

TEPs can offer toolsmiths support to build tools 204 that combine temporal and spatial contexts to provide the right subtool 330 recommendation in the right location at the right time. This helps reduce or avoid the late awareness problem, which occurs when a developer does not realize that they are performing a known sequence of actions, that is, a sequence corresponding to an existing subtool. Late awareness is a primary reason for under use of IDE subtools such as automated refactorings.

Designing tools and quick actions based on temporal context relies on insights into the common TEPs in the sequence of edits performed by developers. However, these insights are not easy to obtain through mining version control data: any relevant fine-grained sequence of edits is often lost when a developer pushes the changed source code as a single commit to the version control history. Some teachings herein facilitate producing TEPs of a form such as AddProp(type, propName), AddConstrParam(type, paramName), AddAssignment(paramName, propName), for enhanced support for code editing.

Further, not every TEP is a simple sequence of individual edits. For example, removing a parameter from a method declaration and then updating all its call sites by removing the corresponding argument may be described as a sequence DelParam(method, paramName) DelArg(method, paramName)*, where the (*) stands for Kleene star. In general, TEPs 304 are given by regular expressions over individual edit patterns.

A person of skill may acknowledge various technical challenges in mining TEPs. Three challenges involve Level of Granularity, Level of Generalization, and Temporal Summarization. These are discussed using an example of syntactically correct versions while adding and initializing a property during a software development editing session, illustrated in FIG. 15.

Level of Granularity. In a generalizing data structure, an edit denoted as v0→v3 (referencing FIG. 15) may play the role of add property in an "add property, add parameter, and initialize property" sequence. However, this edit is a generalization of several underlying finer grained edits in an actual editing session. Depending on the scenario a toolsmith is examining, the edits may need to be grouped, or be sub-divided. That is, the session may be considered at different levels of granularity.

Level of Generalization. In addition to an appropriate granularity of edits, an approach may also consider the level of generality of a single edit. In the session, the edit v0→v3 could be considered under different levels of generalization, e.g., "insert an AST node", "insert a property", "insert a get-set property", etc. (AST means abstract syntax tree.) When the toolsmith is examining the add and initialize property scenario, it does matter that v0→v3 the insertion is of a property, not just any AST node. However, that v0→v3 adds a get-set property is irrelevant, only that it adds a property. Therefore, apart from different levels of granularity, an approach may also consider each single edit at different levels of generalization.

Temporal Summarization. Different developers perform the same logical edit using completely different steps. In one case, a developer performs edits in a sequence: add property, add constructor parameter, and add assignment. However, other developers (or even the same developer at another time) may use the order: add constructor parameter, add assignment, and then, add property. A toolsmith may be interested not merely in any single sequence, but in a summary of all sequences used by developers to perform the logical edit. Hence, apart from finding the edit sequence pattern at the right granularity and generalization in one session, one challenge is to do so across multiple sessions and summarize all these sequence patterns into a single TEP that represents all ways of performing the same logical edit.

As a working definition, an edit sequence ed0 . . . edn is a sequence of contiguous edits. For instance, inserting a character, deleting a character, selecting a word, moving a cursor, and similar operations are edits 310. An approach may represent similar edits using edit patterns. Formally, an edit pattern, EP, is given by one of Update[pred], InsertChild [pred], or DeleteChild[pred] where pred is a predicate over the edit parameters. An edit ed satisfies the edit pattern EP (written ed I=EP) if the type of edit matches and pred holds over the parameters of ed. A shorthand notation may be used to represent common edit patterns. For example, a notation may use DelArg[method, position] to represent the edit pattern DeleteChild [parent.Kind=ArgumentListAparent.Method=method A i=position].

An edit sequence pattern 702 is a sequence of edit patterns EP0 . . . EPn and ed0 . . . edn|=EP0 . . . EPn if: (a) ∀i.edi|=EPi, and (b) the parameter values correspond across all edi. For example, DelParam(method, paramName)· DelArg(method, paramName) is satisfied by ed1ed2 if the method names and parameter names are the same in both ed1 and ed2.

Different notations may be used. For instance, instead of a middle dot· between DelParam(method, paramName) and DelArg(method, paramName), a notation could use a comma, or some other glyph.

Intuitively, a TEP is a regular expression style description that represents multiple edit sequence patterns 702 for the same task. Formally, a TEP is one of: (a) an edit pattern, (b) a concatenation TEP1·TEP2, (c) a Kleene star TEP*1, or (d) an alternation TEP1|TP2. Concatenation, Kleene star, and alternation have their usual meanings as in familiar regular expressions.

One approach to generating TEPs takes as input a set of development sessions 1008, and in a semi-automated manner, produces a number of TEPs 304. This approach includes several major steps illustrated in FIG. 10. These steps include building 1002 an edit graph 302 that contains information about the granularity 328 and sequencing of edits 310 in input sessions, and building 1004 hierarchical clusters 1006 of all edits 310 in the input sessions, with clusters representing edit patterns 1006 at multiple levels of generality. Edit patterns 1006 and the edit graph 302 are combined 1010 to produce a summary 1012 of information about edits in the edit graph at the level of the clusters. TEPs 304 are mined 1014 from this summary 1012.

Mining may be done in a semi-automated manner. One approach generates sketches of the patterns, and then a user manually annotates these sketches, adding the predicates of the edit patterns.

In this example approach, the edit graph represents all edits in all input sessions, as a graph. First, the approach collects the set of all edits at all granularities in the input sessions, i.e., edits between all pairs (not necessarily consecutive) of versions. Since the number of edits grows quadratically in the length of the session, in practice, an approach may prune 1342 the edits as follows. First, debounce 1342 the transient edits, e.g., delete edits where the two versions were separated by less than 500 ms of time. Second, remove 1342 edits where the change is larger than a given threshold. Large edits are likely to incorporate edits that are completely unrelated to each other, for example, the edit of adding a new class and implementing all its methods is likely to contain many unrelated edits. Now, the individual edits from this pruned set form the nodes of the graph 302, and the sequencing and subsumption relations define the edges Eseq and Esub, respectively.

A function HierarchicalClusters in an Algorithm TEP-1 illustrated in FIG. 14 produces clusters of edits which correspond to edit patterns 1006. These hierarchical clusters will address the problem of level of generalization. The hierarchical clustering procedure generates each of the "insert child", "insert property", and "insert get only property" clusters 1006, with ed1 belonging to each of them. Given such clusters, the approach connects the clusters at different granularities 328 into TEPs that represent different scenarios.

Figure 11:
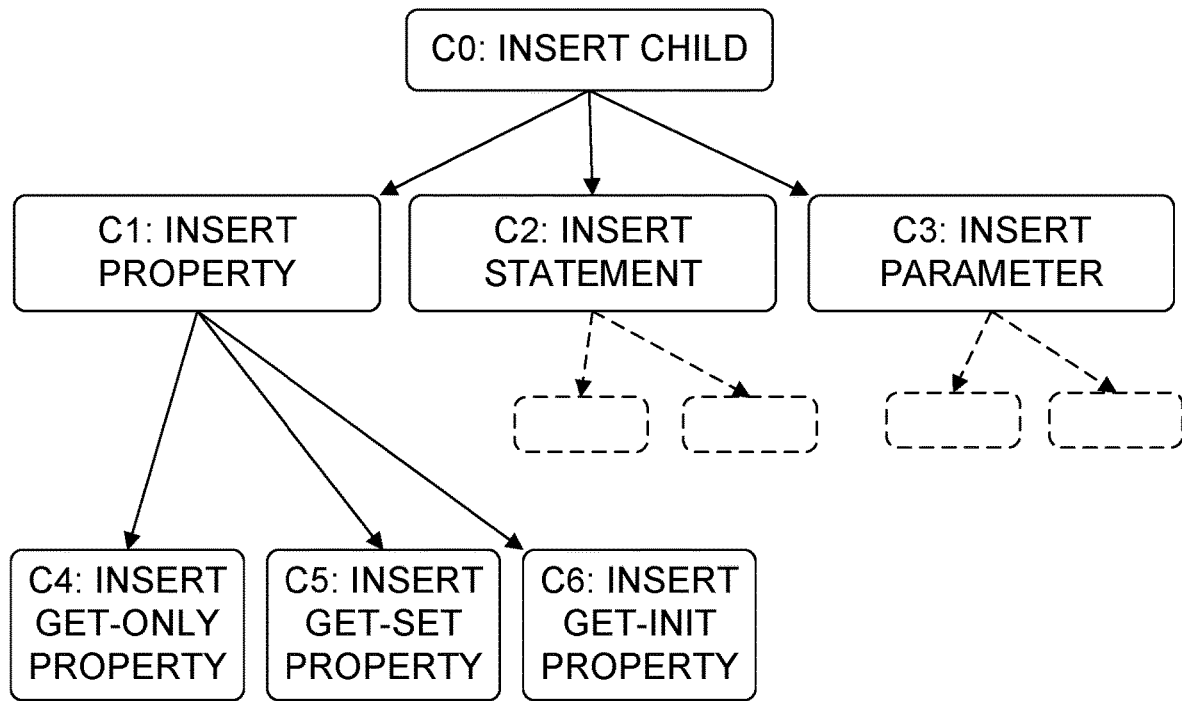
FIG. 11 is a diagram illustrating a fragment of a hierarchical clustering data structure used with a temporal edit pattern functionality.

The function HierarchicalClustering differs from familiar algorithms in using different distance functions at each depth. FIG. 11 shows a part of the hierarchical clusters produced 1004 by the procedure HierarchicalClustering. The clusters account for the generality problem noted above. The approach obtains clusters C1, C2 and C3 by performing unsupervised clustering on C0 using a distance function embed1. Embedding embed1 only encodes a label of an AST node, e.g., Statement, Property, etc. The distance between all edits on the same label is 0, and for different labels is non-zero. Hence, this approach gets clusters corresponding to insertion of each kind of AST node. At depth 2, the edits in C1 are clustered using embed2, which encodes information about the inserted property's: (a) parent (here, always a ClassBody), and (b) direct children (e.g., GetAccessor and SetAccessor). Therefore, embed2 incorporates accessor information and this approach obtains the clusters C4 insert get-only property, C5 insert get-set property, and C6 insert get-init property. The procedure Quotient computes the quotient graph of EditGraph modulo Clusters. It lifts the edit graph's sequencing and subsumption information to the clusters. The set of vertices is given by Clusters. Classically, an edge exists between two clusters C and C' when there exist ed∈C, ed'∈C' with an edge between them. The current approach strengthens the requirement by asking at least n different pairs of such ed and ed'. This ensures that the TEPs generated are general, i.e., there are multiple instances of the pattern. Some embodiments use n=2. Intuitively, this approach connects edit patterns DelParam and DelArg only if there are n concrete instances where one follows the other. The quotient graph summarizes information at multiple levels of (a) generalization, as each edit is a part of multiple clusters at different depths; and (b) granularity, as it contains clusters corresponding to both coarse grained and fine grained edits with subsumption edges between them.

Figure 12:
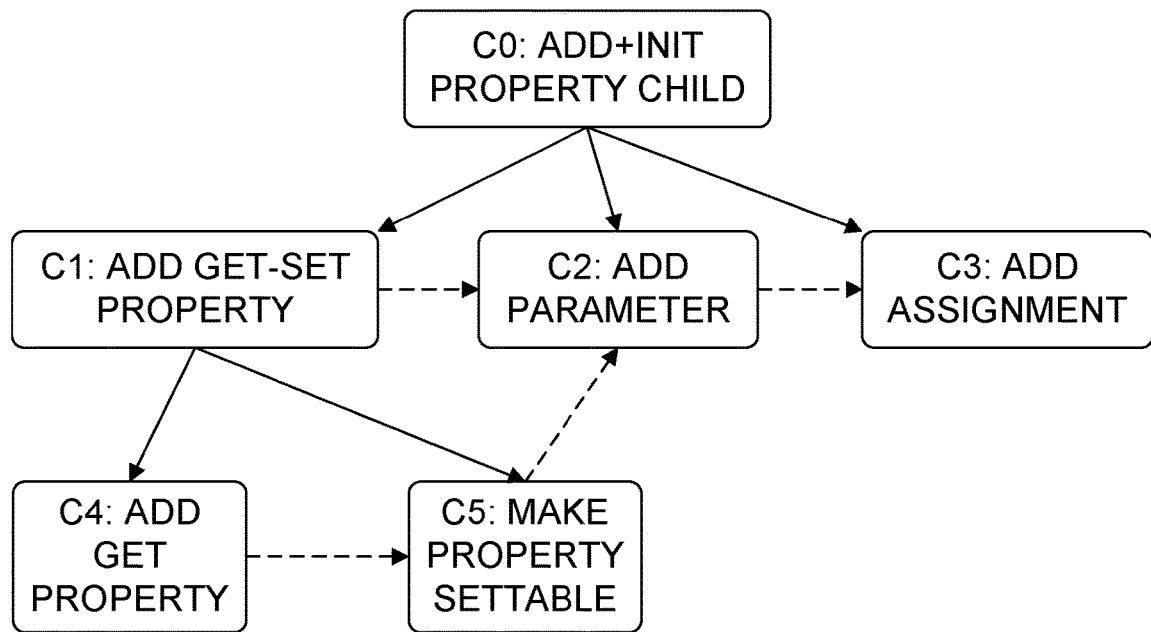
FIG. 12 is a diagram illustrating a temporal edit summary data structure used with a temporal edit pattern functionality.

FIG. 12 illustrates a quotient graph. Solid arrows represent subsumption, and dashed arrows represent sequencing. The add and initialize property cluster C0 subsumes the add property C1, add parameter C2, and add assignment C3 clusters, breaking up C0 into 3 separate smaller steps. The add property cluster is again sub-divided into two clusters (add a get-only property C4 and make a property settable C5). Note the sequencing edge between C5 and C2. This cross connection between different depths allows "mix-and-match" granularity levels in the same edit sequence pattern. This approach can potentially generate two different TEPs, one related to "make property settable" and "add parameter" and another related to "add get-set prop" and "add parameter"; that is, the approach can treat v0→v3 both atomically and as a combination of v0→v2 and v2→v3.

An approach may generate TEPs in a semi-automated way. First, based on a user-provided upper bound on the length, the approach generates paths in the quotient graph. To generate these, the approach first starts by considering all length 1 paths, i.e., a single cluster. Iteratively, the approach generates new paths by extending the edit sequence patterns C1 . . . Cn by appending Cn+1 if (1) n+1 is less that the length bound, (2) there exists at least one concrete edit sequence in an input session that corresponds to the path C1

. . . Cn+1, and (3) there exists a cluster C such that $\forall 1 \leq i \leq n+1. C \rightarrow sub\ Ci$. At this point, the approach combines the cluster paths into cluster expressions, which are akin to temporal edit expressions, but with edit patterns replaced with clusters. This combination is done heuristically, by introducing Kleene stars on single clusters based on the existence of self-edges in the quotient graphs, and by replacing cluster paths corresponding to all permutations of a set of clusters with the unordered sequence operator.

In a manual step, the user validates these cluster expressions and converts them into TEPs by replacing clusters with equivalent edit patterns. Validation may be prudent due to sketches lacking parameter constraints. For example, in DelParam(method, paramName) DelArg(method, paramName), the method and parameter name should be shared across the edit patterns. However, in the cluster path, this constraint might not be ensured. An approach may rely on the user to ensure that at least one concrete edit sequence corresponding to the cluster path satisfies this constraint. Then, the user annotates each cluster with the equivalent edit pattern.

A goal of this data analysis may be to find temporal edit sequences that are relevant to the toolsmiths. For this purpose, an approach may first identify the temporal edit sequences that capture multiple ways of performing a task. A pattern may be deemed relevant if it is related to an existing IDE feature or a feature request, for example. TEPs may be further manually analyzed to identify the high-level programming task performed, and be coded using established guidelines from the literature. TEPs that were related to the same edit task may be unified them into a single pattern, which represents multiple ways to perform the high-level programming edit task. Identified TEPs may be categorized, e.g., the IDE automation subtools 330 (if any) that could assist at performing the pattern. If none are found, new subtools 330 may be created.

Some Temporal Edit Patterns

Following is a list describing some temporal edit patterns 304, also referred to a TEPs 304. This list of TEPs is not necessarily complete, but is instead provided as illustrative. For convenience, each TEP is given as a brief descriptive name followed by a colon followed by a sequence of edit patterns. An edit pattern has a name followed by a parameter list in parentheses. A middle dot · between two edit patterns indicates one edit pattern follows the preceding edit pattern in an execution sequence of the TEPs. Vertical bars | indicate alternatives, e.g., alternative execution sequences within a TEP. Asterisk * denotes repetition.

Create Property: AddProp(type, propName)·AddGet(propName), AddSet(propName))|AddProp(type, propName)·Update(propName, propName1)·Update(type1, type2))

Create If Statement: AddIf (pred, emptyBlock)·AdReturnStatement(emptyBlock)|AddIf (pred, emptyBlock)·DeleteLocalVar(type, var)·AddLocalVar(emptyBlock, var)

Create Method Parameter: AddParam(type, paramName) |AddParam(type, paramName)·AddDefaultInitalizer (paramName)

Create multiple properties: AddProp(type, propName)*

Create multiple statements: Add ExpressionStatement(receiver, method, arg)*

Create Variable & initialize: AddLocalVar(type, var)·AddInitalizer(paramName)

Create Variable & invoke instance method: AddLocalVar (type, var)·InsCallsite(var, method)

Create Method & use it: AddMethodDecl(method)·InsCallsite(method)

Create Method Invocation AddMethodInvocation (method)·AddArg(method, arg)

Rename: UpdLocalVar(var1, var2) UpdIdentifier(var1, var2)*

Extract Constant: AddLocalVar(type, var, const)· UpdateIdentifier(const, var)*

Move Static Method: DelMethod(cls1, method)·InsMethod(cls2, method)·UpdCallSiteReceiver(method, cls2)

Insert parameter & add args at callsites: AddParam (method, paramName, i)·AddArg(method, arg, i)*

Delete parameter & drop args at callsites: DelParam (method, paramName, i)·DelArg(method, arg, i)*

Promote local variable to field: DelLocalVar(type, name)·AddField(type, name)|UpdLocalVarToAssignment (var, type) AddField(var, type)

Add Property-Parameter-Assignment: AddProp(type, propName)·

AddParam(type, propName)·AddAssignment(propName) |AddParam(type, paramName)·AddProp(type, paramName)·

AddAssignment(paramName)

Add Property-Constructor1: AddProp(class, type, propName)·AddConstructor(class, type, propName)

Introduce Local Variable: InsExpressionStatement (type)·UpdExpressionStatement(type, var)

Generate a method: InsMethodInvocation(method, lenParams)·InsMethodDecl(method, lenParams)

Multiple Insert Parameter refactoring: AddParam (method, paramName, i)|AddArg(method, arg, i)|{|AddParam(method, paramName, i)·AddArg(method, arg, i)|}

Multiple Delete Parameter refactoring: DelParam (method, paramName, i)|DelArg(method, arg, i)|{|DelParam(method, paramName, i)·DelArg(method, arg, i)|}

Apply all use implicit type in a block: UpdVariableDeclaration(type, varKeyword)*

Apply all remove 'this' qualification: Del(thisKeyword)*

Apply naming conventions: UpdMethodName(method1, method2)*

Multiple Add Property-Parameter-Assignment: AddProp (type, propName)|(AddParam(type, propName)|AddAssignment(propName)|AddProp(type, propName)*·AddParam(type, propName)*·AddAssignment(propName)*

Change Type & rename: UpdateLocalVar(var1, var2)·UpdateLocalVar(type1, type2)|UpdateLocalVar (type1, type2)·UpdateLocalVar(var1, var2)

Add Property & initalize in constructor: AddProp(type, propName)·AddAssignment(type, propName)

Delete Property & its usage in constructor: DelProp(type, propName)·DelAssignment(propName)|DelAssignment (propName, rhs)·DelProperty(propName)

Fix Method Return type: UpdReturnStatement(e1, e2)·UpdateMethod(type1, type2)

Delete variable & its usages: DelLocalVar(var), DelStatement(refers=var)|DelStatement(refers=var)·DelLocalVar (var)

Create Variable & add if: AddLocalVar(var)·AddIf (conditionRefers=var)

Create Variable & add foreach: AddLocalVar(var)·AddForeach(iterateOver=var)

Particular TEPs may be applicable to fields, applicable to variable declarations and assignments, or applicable to fields, properties and local variables, for example.

In some approaches, an automatable edit sequence is an edit sequence performed by a developer manually and laboriously that could have been performed easily using an IDE subtool 330. Many subtools 330 are hard to discover (discoverability challenge), and even when they are discoverable, developers do not realize the possibility of using it at the time (late-awareness challenge). These problems occur with refactoring, for example, and with authoring features such as code generators and even snippet insertions. Snippets may be integrated into completion lists or other auto-completion subtools, which can help to improve the feature discoverability. However, to make the Insert Property snippet appear in the completion list in some IDEs, a developer has to type prop instead of start writing the property itself.

Moreover, the fact that developers often do not write code in a linear way (adding tokens one by one, from left to right), contributes to the underuse of authoring features. A copy-paste-update pattern is a common way for developers to write code, from inserting a new property to adding a similar if condition or creating a new method. This non-linear way of writing code is addressed by embodiments, e.g., via TEPs with multiple entry points, and by using edit graphs to detect that developers are performing an automatable edit.

In some embodiments, TEPs are described as regular expressions that can be easily integrated into tools to detect the manual application of, e.g., an Introduce Constant refactoring. The first manually applied edit adds a variable declaration that assigns a constant to the variable. This edit would match the first edit pattern AddVarDecl(type, varName, constVal). At this point, a tool could detect that the user is potentially applying the Introduce Constant refactoring. If the next operation continues to match the pattern, its confidence score would increase. A conservative approach could be to wait for the developer to perform the second edit, which would continue to match the pattern, and then offer a suggestion to automate the last one. A tool could alternatively combine both temporal and spatial context to offer the suggestion as soon as the developer goes to the second location to apply the second edit.

For instance, suppose that in one IDE the highest-ranked quick action for a property is Replace Property With Method. For a newly created property, the IDE could use the temporal context to rank the quick action Add Parameter to Constructor (lower in the list) as higher. The temporal context could also be used to show this property even if the developer moves the cursor from the property location to the constructor location, to reduce discoverability and late-awareness problems. Thus, TEPs can help improve ranking and filtering of suggestions.

Additionally, a tool may suggest a composition of quick actions or other subtools 330. Suppose a developer is applying the same quick action multiple times, e.g., for refactoring. Instead of forcing the developer to repeatedly select and initiate the refactoring, an IDE could identify the developer's intent and recommend the application of the Use Implicit Type refactoring to the rest of the file, possibly after modifying the editor configuration to add this refactoring to a clean up option.

Approaches taught herein differ from techniques that either focus on a specific kind of edit or operate on coarse-grained version control system (VCS) data. VCS data is imprecise, incomplete and lacks a sufficient temporal aspect. In contrast, some approaches herein rely on fine-grained data collected directly from an IDE. This allows an approach to detect TEPs that not only capture the high-level code change patterns but also the different workflows or sequences of edits that were applied to perform the change.

Example-Driven Interaction for Expressive Find-Replace

Code editing is often patterned and repetitive. A single conceptual change often requires edits to many code locations. For instance, when a developer changes the order of function parameters, the change needs to be propagated to all call sites. To automate code editing, many meta-languages and tools allow developers to specify patterns in code and effectively perform program transformations to automate individual edits. They parse programs either as text (e.g., regular expressions) or Abstract Syntax Trees (e.g., tree transformers), and drive GUI tools like find-and-replace (F&R) or refactoring tools.

However, existing tools for grouped changes frequently fall short of developers' needs or require too much effort even for seemingly trivial tasks. Instead, developers feel forced to perform code changes manually. Basic text replacement is not powerful enough to express many real-world edits. More powerful F&R with regular expressions (regexes) is rarely used because of the complex and brittle syntax. Refactoring tools (e.g., rename refactorings that simultaneously change function names and all call sites) are limited to the set of supported operations and are often hidden in deep menus making them hard to discover.

Some embodiments taught herein use or provide a mixed-initiative interaction model for specifying light-weight code transformation. Some embodiments provide familiar affordances of F&R but let users demonstrate a change without writing specifications, and leverage program synthesis to generalize the change. Users may perform a nominal find to produce a set of possible change locations and directly edit the source code. The synthesizer then suggests code transformations based on a generalization of user edits. To help users understand the proposed changes, some embodiments provide rich feedback both in a summary view and directly in code. Finally, by changing either the source code or search results, the user can interact with the synthesizer to iteratively improve code changes.

In some embodiments, transformation tools expose their inner workings to the users (e.g., directly showing synthesized transformation programs), while in others less of the inner workings, or none, is shown to users. Instead of providing a full specification upfront written in a special language, some embodiments demonstrate program changes directly in the editor, and a user can then work with the system to iteratively generalize the changes to other locations. Such an inductive workflow helps reduce or solve the problem of discoverability and provides users with better context.

In some strictly textual or modal transformation tools 330, a user typically is assumed to know the tool exists and expected to learn the syntax of a language or UI to perform their editing tasks. In addition, these interactions typically take place out of a current workflow context, such as in a tiny text box for search and preview. By contrast, some embodiments taught herein remain in the current context for both input and output. The user enters example transformations directly in a main editor pane, which provides a full range of support such as syntax highlighting and autocomplete. The embodiment outputs suggestions also directly in the editor, showing code diffs and possible actions directly inline.

For example, consider the following example of a diff view. In this example, existing source code is shown as plain text, edit action buttons are shown in bold, suggested replacement text is shown in italics; each of these is in black with a white background. These visual formats were chosen for use here in part because they conform with Patent Office patent disclosure format requirements. Other visual formatting choices may be used in a given embodiment, e.g., by displaying source code comments in a first color, edit action buttons in a second color, source code that will be replaced in a third color, and replacement source code text in a fourth color. Programming language keywords, recognized identifiers, and other source code constructs may be displayed in respective different colors.

Diff view example:

```
// Save Settings to App Config
Accept Changes | Reject Changes | Accept All in This File
saveSettingsState( ) { saveSettingsState = ( ) => {
    const { currentSettings, boundActionCreators } = this.props;
    boundActionCreators.saveSettings(currentSettings);
}
```

Some embodiments include scoped Accept and Reject commands for operating on more than one target. Some examples include Accept All in This File, Accept All in Files Matching Naming Pattern, Accept All in Current Function, Accept All in Current Class, and so on, include Reject counterparts.

Some embodiments provide a search feature that looks for strings that will yield lists of targets that can be transformed in similar ways. Similarity may be measured by any string metric used for approximate string matching or fuzzy string searching, for example, including phonetic, token, grammatical and character-based methods of statistical comparisons operable as string metrics. For instance, if a user searches for "handle" and uses an embodiment to transform multiple resulting targets, the embodiment may generalize by suggesting a search for "toggle".

In some embodiments, a user only needs to write down a simple search query that will return a superset of what they want to change. Instead of having to match the entire range of text to be changed, the embodiment will generate exact search patterns automatically and will only provide suggestions in a subset of the matches. Additionally, if the synthesizer provides too many unwanted suggestions, the user can optionally ignore extraneous matches, e.g., in a Linked Summary View, at any time. The user generated query and refinement on results together serve as hints for the synthesizer to generate more precise changes later.

Some embodiments allow multiple entry points for the user to specify and refine their intents. The initial search results and changes in the source bootstrap the interactive session between the user and the synthesizer. After receiving the initial feedback from the synthesizer, the user can refine the search results, or directly edit suggested code, or do both, in order to refine the suggestions. After consuming the new information, the synthesizer propagates more precise changes through the codebase by either refining the scope of suggestions or changing the transformations themselves. When happy with the suggestions, users can resolve them in various scopes (e.g., only one match, all matches in the file, everywhere in the project).

When the synthesizer is operating in the background in a black-box manner, the visibility of system status is a notable aspect of an embodiment. In addition to code diffs inline, one Linked Summary View also conveys the status of the synthesizer by directly highlighting search results: Green highlights indicate original edits done by the user; Yellow highlights indicate matches with available suggestions; Blue highlights show the current selection. Of course, different visual indicators may be used in other embodiments.

In some cases, a session begins when a user starts typing in a Search Box. Each match in the search result may be treated as an anchor. When a user clicks an anchor and starts making changes, an embodiment records all edits associated with it. The embodiment stops the recording of the current anchor if the user interacts with a different one. At this point, the user has completed a codechange for this anchor. Formally speaking, a codechange for an anchor a consists of the original document d, a location a in d, and the edited document d' (in which all the changes are accumulated). Note that this embodiment does not impose any restriction on the edit locations. That is, users can edit code anywhere in the document. Hence, a codechange may involves multiple edit locations and scatter across various regions surrounding the anchor. A role of the synthesizer is to learn a generalized program to perform such edits starting from the anchor.

This design allows users to make changes related to an anchor in any order they like. For instance, one user might prefer to delete a bind statement inside a constructor before changing a function in a class body, while another user might prefer the reverse order. Another benefit of this design is that users can return to and re-edit a previously edited anchor, in which case the embodiment updates the anchor's codechange and synthesizes new suggestions.

This embodiment maintains a set of all codechanges the user has made to the document. Whenever the user makes a change to an anchor, the embodiment invokes a main synthesis algorithm FindReplaceSynthesis (shown below) to generate suggestions. The user can accept, reject, or modify the proposed changes. In the latter two cases, the embodiment updates the codechange set and queries the synthesizer for new suggestions. The process continues until the user accepts or rejects each suggestion.

A description of the algorithm FindReplaceSynthesis is shown below, using established notations for membership e, union u, the zero or empty type $\perp$, the empty set { }, and assignment $\leftarrow$, and with lines numbered for convenient reference. The symbol a indicates a comment.

```
1:   procedure FindReplaceSynthesis(codechanges, anchors, synths)
2:       for s ∈ synths do
3:           P ← s.SynthesizeCodeTransform(codechanges)
4:           if P ≠⊥ then
5:               R ← ApplyFindReplace(P, anchors)
6:               P ' ← Translate(P)
7:
                 return( R, P ')
8:           end if
9:       end for
10:  end procedure
11:  procedure ApplyFindReplace(P, anchors)
12:      R ← { }
13:      for a ∈ anchors do
14:          c ← P (a)   ◁ Apply learned program on anchor
15:          if c ≠⊥ then
16:              R ← R ∪( a, c )
17:          end if
18:      end for
19:      return R
20:  end procedure
```

Some embodiments allow plug-and-play of different synthesizers, as long as they can learn and perform code transformations by examples. Such an entire system is parameterized by synthesizers. At a high-level, Find ReplaceSynthesis takes as input a list of codechanges in some anchors, the list of all anchors (potential candidates for suggestions), and a ranked list of available synthesizers. The algorithm finds the first synthesizer that can learn a transformation program P for the provided codechanges (algorithm line 3). It then applies P on all other anchors to make suggestions. The algorithm ignores anchors that are not applicable to the transformation (line 15). This is done when find result is an over-approximation of the edit locations. This algorithm returns the set of suggestions, and optionally a human-inspectable format of the learned program (line 7). The algorithm may be modified. For instance, it may assume a single synthesizer is used.

The algorithm may be implemented as an extension of an IDE. Features may be implemented within a Search View and a main editor pane. First, implementation may augment the Search View to indicate the state of each search match. Second, the main editor may capture user edits and surface suggestions using inline code diffs and actionable contextual information interspersed in source code. Finally, a program synthesizer may run as an editor service in the background and generate transformation programs based on user edits. An implementation may be extensible and may support multiple transformation formats (e.g., regexes, codemods, and editor-supported refactorings).

Some embodiments distribute the cognitive load of specification. Some traditional tools require upfront specification of the search scope and transformation in an atomic interaction. In one step, the user is called on to address three concerns: (1) what code pattern to search for, (2) what to replace the pattern with, and (3) which parts of the matched code get reused in the replacement. Developers may be eager to make use of automation, but traditional automated tools for code transformation often require too high an upfront cost. In addition, participants often have difficulty estimating the cost of automation. Some embodiments address this challenge in part by enabling developers to search for matches and perform edits as orthogonal search and replace steps. Some embodiments provide a unified interface that can sit on top of many underlying technologies. Instead of deciding on whether to use regexes, codemods, or editor macros, an embodiment may provide an opportunity to make more effective decisions based on the required transformation. Some embodiments leverage the familiarity of F&R and present an effective user experience to generalize edits globally. Instead of having to pick from either editing by character or batching edits all at once, an embodiment may provide a middle ground where edits are specified at the low level but generalized incrementally. This more inductive process provides a natural transition from one extreme to the other, thereby making code edits happen in an iteratively wider scope.

Additionally, since the synthesizer may keep a formal representation that encodes the user intent, some embodiments provide an opportunity to reuse and share past edits. For instance, a user may encounter a similar change in the near future and they can use the embodiment to keep the old edits around. Beyond personal reuse, since multiple developers tend to work on the same codebase in realistic settings, it is also possible to share saved edits with peers. This may be done in a manner that allows lighter-weight creation and maintenance of code transforms shared across individual developers than other approaches. When transforms are reused, the interactive experience of an embodiment also allows for refinement of existing transforms. As a result, users can incrementally build up understanding of and confidence in existing transformations as they interact with them through an embodiment.

Some embodiments present a simple, file-centric model for displaying search results. When results are numerous, more intelligent clustering or visualization may communicate the state of the search more efficiently to the users. Programs are often highly structured, so in addition to text similarity, structural similarity may be a criterion for efficient clustering. For instance, an F&R might cluster matches by their relative location in the program, such as "all bind calls in constructors".

Technical Character

The technical character of embodiments described herein will be apparent to one of ordinary skill in the art, and will also be apparent in several ways to a wide range of attentive readers. Some embodiments address technical activities such as executing edit automation software 306, communicating 806, 808 with a transform provider 216, applying 812 transforms to edit a document in a software tool 204, actuating 1304 automation subtools 330, filtering out 1342 noise from an edit sequence, and building 904 edit graph data structures 302, which are each an activity deeply rooted in computing technology. Some of the technical mechanisms discussed include, e.g., temporal edit patterns 304, anchor target lists 316, edit automation subtools 330, edit graphs 302, automatable edit sequence libraries 220, transforms 218, and transform providers 216. Some of the technical effects discussed include, e.g., enhanced discoverability of available subtools 330 generally and in mitigation of late awareness in particular, enhanced discovery of similar locations to which a transform may apply (even to the extent of sharing locations or a location-identifying pattern across a team or across a project or codebase), enhancement of subtool flexibility via multiple entry points 326, improved user satisfaction and productivity from staying 1318 within a workflow during edit automation, and broader scope of available subtools through improved temporal edit pattern generation 1000 and transform synthesis. Thus, purely mental processes and activities limited to pen-and-paper are clearly excluded. Other advantages based on the technical characteristics of the teachings will also be apparent to one of skill from the description provided.

Some embodiments described herein may be viewed by some people in a broader context. For instance, concepts such as availability, awareness, ease, efficiency, or user satisfaction, may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to automatically and effectively utilize edit automation subtools 330 that are difficult for users to discover manually. Other configured storage media, systems, and processes involving availability, awareness, ease, efficiency, or user satisfaction are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples, operating environments, time period examples, software processes, security tools, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, abbreviations, names, and symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
GUID: globally unique identifier
HIDS: host intrusion detection system
HTTP(S): hypertext transfer protocol (secure)
IaaS or IAAS: infrastructure-as-a-service
ID: identification or identity
ITD: Intelligent Threat Detection
IP: internet protocol
LAN: local area network
NIDS: network intrusion detection system
OS: operating system
PaaS or PAAS: platform-as-a-service
RAM: random access memory
ROM: read only memory
SIEM: security information and event management; also refers to tools which provide security information and event management
TCP: transmission control protocol
TLS: transport layer security
TPU: tensor processing unit
UDP: user datagram protocol
UEFI: Unified Extensible Firmware Interface
URI: uniform resource identifier
URL: uniform resource locator
USB: universal serial bus
VM: virtual machine
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (laaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

With regard to editor user interfaces, "find" and "search" mean the same thing as each other herein.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Edit automation operations such as applying 812 transforms, generating 1000 temporal edit patterns, building 904 edit graphs, communicating 806, 808 with a transform provider 216, and many other operations discussed herein, are understood to be inherently digital. A human mind cannot interface directly with a CPU or other processor, or with RAM or other digital storage, to read and write the necessary data to perform the edit automation steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as actuating, applying, building, choosing, clustering, displaying, editing, extracting, getting, inferring, leveraging, matching, mining, modifying, obtaining, offering, placing, providing, receiving, recommending, removing, saving, submitting, summarizing, switching, utilizing (and actuates, actuated, applies, applied, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment

102 computer system, also referred to as a "computational system" or "computing system", and when in a network may be referred to as a "node"

104 users, e.g., user of an enhanced system 202

106 peripherals

108 network generally, including, e.g., LANs, WANs, software-defined networks, clouds, and other wired or wireless networks

110 processor 112 computer-readable storage medium, e.g., RAM, hard disks 114 removable configured computer-readable storage medium 116 instructions executable with processor; may be on removable storage media or in other memory (volatile or nonvolatile or both)

118 data 120 kernel(s), e.g., operating system(s), BIOS, UEFI, device drivers 122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, and so on 124 applications, e.g., word processors, web browsers, spreadsheets, games, email tools, commands 126 display screens, also referred to as "displays"

128 computing hardware not otherwise associated with a reference number 106, 108, 110, 112, 114

202 system 102 enhanced with edit automation functionality 210

204 tool 122 or application 124 enhanced with edit automation functionality 210

206 digital document, e.g., word processor document, spreadsheet document, source code document, or other document in digital (computer-readable and software-editable) format; may include text, graphics, sound, etc.

208 user interface generally; part of a tool 204

210 edit automation functionality, e.g., functionality 312 or 314, or an implementation providing functionality for any previously unknown method or previously unknown data structure shown in any Figure of the present disclosure 212 edit automation generally 214 digital file, blob, container, or other digital storage unit(s)

216 transform provider, e.g., example-driven synthesizer of pattern match codes or of both pattern match codes 506 and transforms 218; such a synthesizer may use Microsoft PROSE™ technology or another program synthesis technology to synthesize pattern match code, or text transforms, or both, that implement computational operations that produce the desired results (mark of Microsoft Corporation); transform provider may also or instead include a library 220

218 transform, e.g., a script, regex, subtool, or other computational mechanism which upon execution (also referred to as "actuation" or "application") automatically edits text 220 library of automatable edit sequences; each library entry has a pattern matching portion (e.g., edit graph 302) and a transform portion (e.g., TEP 304)

222 automatable edit sequence, e.g., an entry in a library 220; depending on context, the pattern matching portion of an entry may also be referred to on its own as an automatable edit sequence, as may a sequence of edits 310 that match the pattern matching portion 302 edit graph data structure; a portion of an edit graph is itself an edit graph 304 temporal edit pattern data structure 306 edit automation software, e.g., software which performs any method according to any of the Figures herein or utilizes any data structure according to any of the Figures herein 308 interface generally to a system 102 or portion thereof; may include, e.g., shells, graphical or other user interfaces, network addresses, APIs, network interface cards, ports 310 edit, e.g., version change in a document 312 temporal edit pattern functionality, e.g., a functionality which computationally generates, modifies, or utilizes a temporal edit pattern 304

314 anchor target list functionality, e.g., a functionality which computationally generates, modifies, or utilizes an anchor target list 316

316 anchor target list data structure 318 anchor location 414; also refers to data structure representing such a location 320 target location 414; also refers to data structure representing such a location 322 temporal data; an example of data 118 representing a point in time or events, involving one or more documents 324 spatial data; an example of data 118 representing location in one or more documents 326 entry point of a TEP 304; also refers to a beginning point of an edit sequence which is represented in the TEP 328 granularity of a data structure, e.g., extent to which a unit in the data structure represents multiple more specific constituent units 330 edit automation subtool, whether pre-existing or created hereafter 332 edit sequence data structure 402 string search; views source code as merely text, as opposed to a structural search 404 string search results, e.g., locations of matching string instances in a document, or the instances themselves 406 structural search; views source code as representing tokens, e.g., in an abstract syntax tree; structural search may also be known as "semantic" search, search based on tokens after parsing, search using abstract syntax tree, or search based on data flow analysis results 408 structural search results, e.g., locations of source code matching token instances, or the instances themselves 410 designation of one or more locations in a document, e.g., a list of line numbers or other index(es) into the document; data structure 412 list of one or more designated locations; data structure; e.g., a list of highlighted locations, or bookmarked locations, or user-generated locations, or any other list of locations 414 location generally; refers to any location in a document 206

416 compilation; may refer to a compiling process, compiler, or a result of compiling 418 error, e.g., message for corresponding location at which an apparent error has been found by a tool 122, or the corresponding location itself, or any data structure representing either 420 warning, e.g., message for corresponding location at which a notable circumstance has been found by a tool 122, or the corresponding location itself, or any data structure representing either; errors 418 and warning 420 may be distinguished in some situations, e.g., as to relative severity or available responses, but for present purposes that distinction is not important, because each may result in or correspond with a location in an anchor target list 316

422 software development generally

424 software development tool, e.g., compiler, debugger, profiler, or other tool 122 which is utilized to create software, evaluate software, modify software, deploy software, or otherwise facilitate software usage or performance

426 user-editability or result of user editing a list or other item; a target list 316 may be editable 426 by a user, in that the user can do at least one of: add target to list, remove target from list, leave target in list but ignore it when applying transform, or change order of targets in list thereby ranking them

428 clusterability or clustering of a list or other set of items; a list of targets may be automatically clustered 428, e.g., when similar kinds of changes are together, changes for a given location are together, better changes are together or worse changes are together; this may be done on a per-target-basis by a user, or the user may apply mechanisms to filter or sort or cluster; the computational definition of "similar" is determined by clustering criteria, e.g., one or more of: a string distance metric, a vector similarity metric, list of structural search signals, whether text is in a comment or the same file or same directory or unit tests or a method signature or a constructor or an initializer or deprecated or in a nested if statement or in a loop or in a class or in a class derived from X or in the same namespace or public or in an import statement or in a function with N args or by which kind of find to use, or in the same project or solution, or in a code context generally as determined by synthesizer; such clustering criteria may also serve as structural search constraints 1310

430 source code (in digital form)

432 length of a list, e.g., number of locations in a list 316

502 transform synthesizer

504 confidence score

506 pattern match code, e.g., regex

508 pattern match instance, e.g., set of all strings which are considered matches to a regular expression 506

510 example of text to find

512 data structure representing user feedback regarding a transform, anchor target list, or other computational product

514 interface to library 220, e.g., an API

602 user interface (UI) mechanism, e.g., diff view, window, menu, and so on

604 intrusiveness of a UI mechanism; may be determined, e.g., by user surveys and then represented as a digital value

606 editing workflow, e.g., a sequence of interactions between a user and a system, with attendant metadata as to the current goal of the interaction and how that goal relates (or fails to relate) to other goals of an edit session

608 intrusiveness rank, e.g., position in an ordered list of intrusiveness values, or membership in a intrusiveness category (e.g., low, medium, high)

610 recommendation from system to user for an editing operation; also referred to as "suggestion" or "offering"; may refer to the content describing the recommendation or to a result described in that content; refers to a data structure

612 recommendation presentation, e.g., system action of displaying a recommendation

614 diff view in a user interface, e.g., a before-and-after display of source code illustrating the effect of performing a recommended transform, which shows the "before" version of the source in the same location it was in before the transform was recommended, and shows the "after" version next to the "before" version

616 clickable or pressable or otherwise selectable button in a UI, may include a hyperlink

618 computational action performed in response to user selection

620 input device, e.g., keyboard, mouse, touch screen, etc.

622 ambient visualization screen region (AVSR); also known as ambient visualization area or ambient display area; for a given time period, a screen area of height ten lines or less within which a user focused for more than half the time period (verifiable by eye tracking or user survey, for example) or in which an edit caret remained, or a mouse hover location remained

624 user commands; actuating a transform is one kind of command

626 line in a source code or other text document; terminated by newline or wraparound, for example

628 initiative during an edit session, e.g., source of an edit

630 request or command to undo a prior computational action

702 edit sequence pattern

704 snippet of source code, e.g., less than twenty lines of code

706 insertion of a snippet into a document; performed computationally

708 item, e.g., variable, method, class, or other tokenized item or an identifier, which can be completed using autocompletion edit automation

710 completion edit automation; also called "autocompletion"

712 quick action, e.g., a command or functionality to refactor code, generate code, or otherwise modify code with a single UI gesture or action

714 feature, e.g., property or method

716 feature request

718 variable, e.g., a data storage location that is named or that takes on multiple values during execution of a program, or both

720 variable condition, e.g., for controlling a loop or if statement; a command to edit code to delete a variable and its usages, or to create a variable and add at least part of an if statement or switch statement, or to create a variable and add at least part of a foreach statement or other loop

722 refactoring; e.g., command to alter a routine's parameter list as to parameter order, number of parameters, or parameter type, or alter a routine's return value presence or type, or change dependency as to APIs, or to perform any of the following items from the list of TEP examples: "Extract Constant" through "Apply all remove 'this' qualification", "Multiple Add Property-Parameter-Assignment", or "Change Type & rename"; also refers to a result of such a command, or any code change that maintains program functionality

724 renaming; e.g., command to rename an item in source code; also refers to a result of such a command

726 TEP or other transform parameter, e.g., location in file

728 computational composition of TEPs or other transforms

730 optimality criterion for selecting TEPs or other transforms

732 optimal TEP or other transform 800 flowchart; 800 also refers to edit automation methods illustrated by or consistent with the FIG. 8 flowchart 802 computationally receive a sequence of document edits occurring at a location that is an anchor or is being treated as an anchor 804 computationally obtain a list of one or more locations that are targets or will be treated as targets 806 computationally submit data to a transform provider 808 computationally get data from a transform provider 810 computationally leverage a transform 812 computationally apply, e.g., execute, a transform 814 computationally recommend, e.g., via a UI, a transform 900 flowchart; 900 also refers to edit automation methods illustrated by or consistent with the FIG. 9 flowchart 902 computationally receive a sequence of document edits 904 computationally build an edit graph 302

906 computationally match a sequence of document edits with a TEP, e.g., via a first edit graph that represents the edit sequence and a second edit graph that is paired with the TEP in a library 220 entry 908 computationally leverage a TEP 910 computationally offer to continue at least a portion of a TEP whose edit sequence has already been partially done manually by a user, or computationally offer to perform a TEP at a different location, e.g., by repeating a (possibly only partly) previously performed TEP at the different location 912 computationally continue at least a portion of a TEP whose edit sequence has already been partially done manually by a user 914 computationally repeat at least a portion of a (possibly only partly) previously performed TEP at a different location 916 computationally display (e.g., on a display 126) a result of continuing 912 or repeating 914

1000 flowchart; 1000 also refers to TEP generation methods illustrated by or consistent with the FIG. 10 flowchart, and to the computational activity of generating one or more TEPs per the FIG. 10 flowchart 1002 computationally extract edits from a recording and build an edit graph representing at least a portion of the edits; it is contemplated that edit recording will usually be done contemporaneously with user editing interaction; the recording need not be saved to nonvolatile storage to qualify as a recording 1004 computationally form hierarchical clusters in an edit graph data structure 1006 clusters representing edit patterns; data structure 1008 development editing session, or other editing session; may be demarcated, e.g., by opening and closing of a file or project or other edited digital storage unit 1010 computationally summarize edit information at a hierarchical cluster level 1012 summarized edit information; data structure 1014 computationally mine summarized edit information to produce one or more TEPs 1300 flowchart; 1300 also refers to edit automation methods illustrated by or consistent with the FIG. 13 flowchart (which incorporates the steps of FIGS. 8 through 10)

1302 computationally ascertain an adjacency relationship between transform executions 1304 computationally actuate (e.g., call, invoke, initiate execution) a subtool 330

1306 computationally avoid switching between input devices as user input sources, e.g., avoid allowing use only of a keyboard for a first operation in an edit sequence followed by allowing use only of a mouse for the next operation 1308 computationally avoid requesting a set of structural search constraints from a user when that request requires the user to choose from a set of three or more displayed constraints; in particular, avoid asking users to check boxes on a list of a dozen or more constraints 1310

1310 structural search constraints, e.g., indications of how to limit a search based on tokens or source code syntax; represented in a data structure 1312 computationally match an edit graph or other edit sequence representation to a TEP entry point 326

1314 computationally match an edit graph or other edit sequence representation to one or more TEPs based at least in part on optimality 732

1316 computationally display a recommendation 1318 computationally stay within an editing workflow 606

1320 computationally place a TEP in a library 220

1322 computationally infer a value for a transform parameter 1324 computationally provide an interface to a library 220, e.g., publish API, enable receipt of edit sequence data 1326 computationally get a confidence score 1328 computationally choose a UI mechanism based at least in part on a confidence score 1330 computationally utilize a UI mechanism, e.g., to display content 1332 computationally move (give or take) editing initiative 1336 computationally displaying a recommendation outside AVSR 1338 computationally infer a change (e.g., via user edit) to a target list 1340 change made to a target list data structure 1342 computationally remove (e.g., filter) noise from data 1344 noise in data, e.g., in a record of edits; what constitutes noise is determined by the noise removal used 1346 display multiple transforms on a display at the same time 1348 computationally save a transform definition or other copy to memory in a retrievable digital format; this allows a user to avoid repeating edits to re-teach the transform provider to provide the transform in a different file 1350 computationally get a user command 1352 computationally modify a transform 1354 computationally configure a transform 1356 any step discussed in the present disclosure that has not been assigned some other reference numeral

CONCLUSION

In short, the teachings herein provide a variety of edit automation functionalities 210 which operate in enhanced systems 202. Edit automation functionality 210, 312, 314 generalizes edits 310 performed by a user in a document 206, locates 804, 904, 402, 406, 506 similar text, and recommends 814 or applies 812 transforms 218 while staying 1318 within a current workflow 606. Source code 430 edits 310 such as refactoring 722 are automated 212. The functionality 210 uses or provides anchor target lists 316, temporal edit patterns 304, edit graphs 302, automatable edit sequence libraries 220, and other data structures and computational techniques for identifying locations 414 that are appropriate for particular edits 310, for getting 808 transforms 218, for selecting 1314 optimal 732 transforms 218, for leveraging 810, 908 transforms 218 in an editing session 1008 or later using a saved 1348 transform 218, and for displaying 910, 916 transform 218 recommendations 610 and results 812. The edit automation functionality 210 enhances automation subtool 330 generation 1000, discoverability, and flexibility, for refactoring 722, snippet insertion 706, quick actions 712, and other subtools 330 in an integrated development environment 204, and other automatable edit sequences 222.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware into SIEM software. Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 8, 9, 10, and 13 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of runtimes or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system configured to receive an edit sequence at one location and then automatically recommend or apply similar editing at another location, the computing system comprising:
a digital memory;
a processor in operable communication with the digital memory, the processor configured to perform editing automation steps including obtaining a list of targets at locations in a document, recording an edit sequence which includes edits corresponding to one of the locations, submitting at least a portion of the recorded edit sequence to a transform provider, getting from the transform provider a transform corresponding to the edit sequence portion, the transform being an automatically generated transform as opposed to being a record of edits performed manually by a developer, using the obtained list to identify at least one other location in the document, and applying the transform to text of the document corresponding to the at least one other location in the document, the transform provider including an automatable edit sequences library containing temporal edit patterns, including at least one temporal edit pattern having a coarser granularity than a recorded edit sequence which matches the temporal edit pattern; and
wherein the computing system includes user interface recommendation presentation mechanisms which are ranked according to their intrusiveness, and the computing system also includes a confidence score associated with a recommended application of the transform or with the transform, and wherein the computing system utilizes a user interface recommendation presentation mechanism which is chosen based on at least the confidence score and the intrusiveness.

2. The computing system of claim 1, wherein the transform provider further includes a transform synthesizer.

3. The computing system of claim 1, wherein the list of targets includes at least one of:
a list of string search results;
a list of source code structural search results;
a list of designated locations;
a list of compilation errors or compilation warnings or both; or
a list of errors or warnings or both generated by a software development tool processing the document.

4. The computing system of claim 1, wherein the list of targets list is further characterized by at least one of:
the list of targets is editable by a user; or
the list of targets is automatically clustered.

5. The computing system of claim 1, wherein at least one of the user interface recommendation presentation mechanisms is ranked as less intrusive than a mechanism that opens a separate window.

6. An editing method suitable for performance by a software tool having a user interface, comprising:
receiving via the user interface an edit sequence representing contiguous edits corresponding to an anchor location of a source code document in the software tool;
obtaining a list of targets located at respective target locations in the source code document other than the anchor location;
submitting the edit sequence to a transform provider, the transform provider including an automatable edit sequences library containing temporal edit patterns, including at least one temporal edit pattern having a coarser granularity than a recorded edit sequence which matches the temporal edit pattern;
getting from the transform provider a transform corresponding to the edit sequence, the transform being an automatically generated transform as opposed to being a record of edits performed manually by a developer;
leveraging the transform by applying the transform to at least one target location in source code text in the document or by configuring the user interface to recommend application of the transform to at least one target location in source code text in the document, or both; and
choosing and utilizing a user interface recommendation presentation mechanism, the choosing based on at least a confidence score and an intrusiveness ranking of the user interface recommendation presentation mechanism, the confidence score associated with a recommended application of the transform or associated with the transform.

7. The method of claim 6, wherein leveraging the transform stays within a current editing workflow in at least one of:
avoiding switching between input devices while receiving a user input which accepts, rejects, or modifies a displayed recommendation to apply the transform;
avoiding requesting structural search constraints from a user;
avoiding displaying, outside of an ambient visualization screen region of the user interface, any recommendation to apply the transform.

8. The method of claim 6, further comprising automatically inferring from user input at least one of:

a deletion from the list of targets;
an addition to the list of targets;
an ordering of the list of targets;
an ignoring by a user of a target; or
a clustering of the list of targets.

9. The method of claim 6, further comprising removing edit sequence noise in at least one of:
removing, from the edit sequencer, edits that correspond to a typographical error correction; or
removing, from the edit sequencer, edits that occur while recording has been paused by a user.

10. The method of claim 6, wherein the list of targets includes at least three target locations and no more than forty target locations, and wherein the transform provider either provides a synthesized transform or provides a transform that is associated with a subtool that has not been previously used in a current editing session.

11. The method of claim 6, further comprising at least one of:
displaying a set of multiple transforms in the user interface, all transforms in the set being based at least in part on the edit sequence submitted to the transform provider; or
saving a copy of the transform in a digital format which allows subsequent use or reuse of the transform.

12. The method of claim 6, wherein leveraging includes recommending application of the transform to at least one target, and the method further comprises at least one of:
getting via the user interface an accept command, and applying the transform to the target;
getting via the user interface a reject command, and avoiding applying the transform to the target; or
getting via the user interface a modify command, modifying the transform into a modified transform, and applying the modified transform to the target.

13. The method of claim 6, wherein the list of targets includes a string search result from a string search performed on a text-to-find example received via the user interface, and the method further comprises:
submitting the text-to-find example to a pattern match synthesizer;
getting from the pattern match synthesizer a corresponding pattern match code;
performing a pattern matching search of the source code document, thereby finding one or more pattern match instances in the document; and
displaying at least one pattern match instance in the user interface, or adding at least one pattern match instance to the list of targets, or both.

14. The method of claim 6, further comprising automatically applying the transform to at least one target in each of a plurality of files.

15. The method of claim 6, wherein leveraging includes recommending application of the transform to at least one target, and wherein recommending includes displaying a diff view of the at least one target at least partially on a same line as the at least one target.

16. A computer-readable storage medium configured with data and instructions which upon execution by a processor cause a computing system to perform an editing method, the method comprising:

receiving an edit sequence representing contiguous edits corresponding to an anchor location of a document in a tool;
obtaining a list of targets located at respective target locations in text in the document other than the anchor location;
submitting the edit sequence to a transform provider, the transform provider including an automatable edit sequences library containing temporal edit patterns, including at least one temporal edit pattern having a coarser granularity than a recorded edit sequence which matches the temporal edit pattern;
getting from the transform provider a transform corresponding to the edit sequence, the transform being an automatically generated transform as opposed to being a record of edits performed manually by a developer;
leveraging the transform by applying the transform to at least one target location in text in the document or by recommending application of the transform to at least one target location in text in the document, or both, said leveraging performed within a single editing workflow; and
choosing and utilizing a user interface recommendation presentation mechanism, the choosing based on at least a confidence score and an intrusiveness ranking of the user interface recommendation presentation mechanism, the confidence score associated with a recommended application of the transform or associated with the transform.

17. The storage medium of claim 16, wherein the computing system operates as a mixed initiative computing system in at least one of:
an editing initiative moves between a user and the computing system as iterations of the editing automation steps are performed; or
the editing initiative moves between the user and the computing system as the computing system acquires user feedback in response to leveraging the transform.

18. The storage medium of claim 16, wherein the method further comprises:
obtaining a user feedback about the transform;
submitting a refinement constraint to the transform provider, the refinement constraint being based on the user feedback;
getting a refined transform from the transform provider, the refined transform based on at least the refinement constraint; and
leveraging the refined transform.

19. The storage medium of claim 18, wherein the user feedback comprises at least one of:
an undo request to undo at least part of an application of the transform;
an edit to a transformed target;
at least two rejections of recommended applications of the transform; or
a cancelation or dismissal of the transform.

20. The storage medium of claim 16, wherein leveraging the transform stays within a current editing workflow at least by avoiding requesting structural search constraints from a user.

* * * * *